US008705463B2

(12) United States Patent
Yu et al.

(10) Patent No.: US 8,705,463 B2
(45) Date of Patent: Apr. 22, 2014

(54) REFERENCE SIGNAL DESIGN FOR WIRELESS COMMUNICATION SYSTEM

(75) Inventors: Dongsheng Yu, Kanata (CA); Yongkang Jia, Ottawa (CA); Hua Xu, Ottawa (CA); Zhijun Cai, Euless, TX (US); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 335 days.

(21) Appl. No.: 12/819,924

(22) Filed: Jun. 21, 2010

(65) Prior Publication Data

US 2010/0322179 A1 Dec. 23, 2010

Related U.S. Application Data

(60) Provisional application No. 61/218,797, filed on Jun. 19, 2009.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| 2008/0232494 | A1* | 9/2008 | Pan et al. ...................... 375/260 |
| 2009/0003274 | A1* | 1/2009 | Kwak et al. ................... 370/329 |
| 2010/0014481 | A1* | 1/2010 | Ko et al. ....................... 370/330 |
| 2010/0290426 | A1* | 11/2010 | Guey et al. ................... 370/330 |

FOREIGN PATENT DOCUMENTS

WO 2008115588 A2 9/2008

OTHER PUBLICATIONS

3GPP TSG-RAN WG1 #57; Qualcomm Europe; Title: Downlink RS Structure in Support of Higher-Order MIMO; R1-092050; San Francisco, USA; May 4-8, 2009; 12 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
3GPP TS 36.300 v8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Mar. 2009; 157 pgs.
3GPP TS 36.211 v8.6.0; 3rd Generation Partnership Project; Technical Specification Group Radio Access Network; Evolved Universal Terrestrial Radio Access (E-UTRA); Physical Channels and Modulation; Release 8; Mar. 2009; 83 pgs.

(Continued)

*Primary Examiner* — Yong Zhou
(74) *Attorney, Agent, or Firm* — Conley Rose, P.C.; J. Robert Brown, Jr.

(57) ABSTRACT

A method and system for identifying a reference signal pattern in contiguous resource blocks received by a user agent (UA) in a wireless communication system where any of one through N contiguous resource blocks may be assigned to a UA, the method performed by a UA and comprising the steps of storing resource block reference signal patterns in a UA memory where the patterns include a separate reference signal pattern for each possible number of contiguous resource blocks that may be assigned to a UA, receiving a resource grant indicating a number contiguous resource block is assigned to the UA, based on the number of contiguous resource blocks assigned to the UA, identifying one of the reference signal patterns in the memory and using the identified one of the reference signal patterns to identify reference signals in contiguously received resource blocks.

16 Claims, 25 Drawing Sheets

(56) References Cited

OTHER PUBLICATIONS

3GPP TS 36.212 v8.6.0; 3rd Generation Partnership Project; Technical Specification Group Radio Access Network; Evolved Universal Terrestrial Radio Access (E-UTRA); Multiplexing and Channel Coding; Release 8; Mar. 2009; 59 pgs.
3GPP TS 36.213 v8.6.0; 3rd Generation Partnership Project; Technical Specification Group Radio Access Network; Evolved Universal Terrestrial Radio Access (E-UTRA); Physical Layer Procedures; Release 8; Mar. 2009; 77 pgs.
3GPP TS 36.321 v8.5.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2009; 46 pgs.
3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.
IEEE 802.16m Broadband Wireless Access Working Group; Title: Sector-Specific Common Pilot Structure in IEEE 802.16m Downlink; Jul. 7, 2008; 7 pgs.
PCT International Search Report; Application No. PCT/US2010/039368; Sep. 12, 2011; 6 pages.
PCT Written Opinion of the International Searching Authority ; Application No. PCT/US2010/039368; Sep. 12, 2011; 13 pages.
3GPP TSG RAN WG1 #56; "DL RS Designs for Higher Order MIMO;" R1-090619; Athens, Greece; Feb. 9-13, 2009; 7 pages.
Yu, Dongsheng, et al.; "Proposal for IEEE 802.16m Downlink Pilot Structure for MIMO;" IEEE C802.16m-08/172rl; Mar. 18, 2008; 44 pages.
Ruegg, Andreas, et al.; "Uplink Pilot Patterns for IEEE 802.16m;" IEEE C802.16m-08/344; May 5, 2008; 5 pages.
Vook, Fred, et al.; "MIMO Considerations for the Downlink Subchannel and Pilot Format Design in IEEE 802.16m;" IEEE C802.16m-08/014; Jan. 16, 2008; 18 pages.
Choi, Jinsoo, et al.; "Basic Resource Block and Pilot Allocation Design in IEEE 802.16m;" IEEE C802.16m-08/090r2; Jan. 16, 2008; 15 pages.
3GPP TR 36.913 V9.0.0; 3rd Generation Partnership Project; Technical Specification Group Radio Access Network; Requirements for Further Advancements for Evolved Universal Terrestrial Radio Access (E-UTRA); (LTE-Advanced); Release 9; Dec. 2009; 15 pages.
3GPP TSG-RAN WG1 #56bis; "Way Forward on RS Design for LTE-Advanced"; R1-091655; Seoul, Korea; Mar. 23-27, 2009; 2 pages.
3GPP TSG-RAN WG1 #56bis; "Way Forward on Further Considerations on RS Design for LTE-A (Revised)"; R1-091657; Seoul, Korea; Mar. 23-27, 2009; 2 pages.
European Examination Report; Application No. 10734854.2; Aug. 21, 2013; 3 pages.
Canadian Office Action; Application No. 2,766,062; Jul. 23, 2013; 9 pages.
Chinese Office Action; Application No. 201080036899.2; Jan. 6, 2014; 13 pages.

* cited by examiner

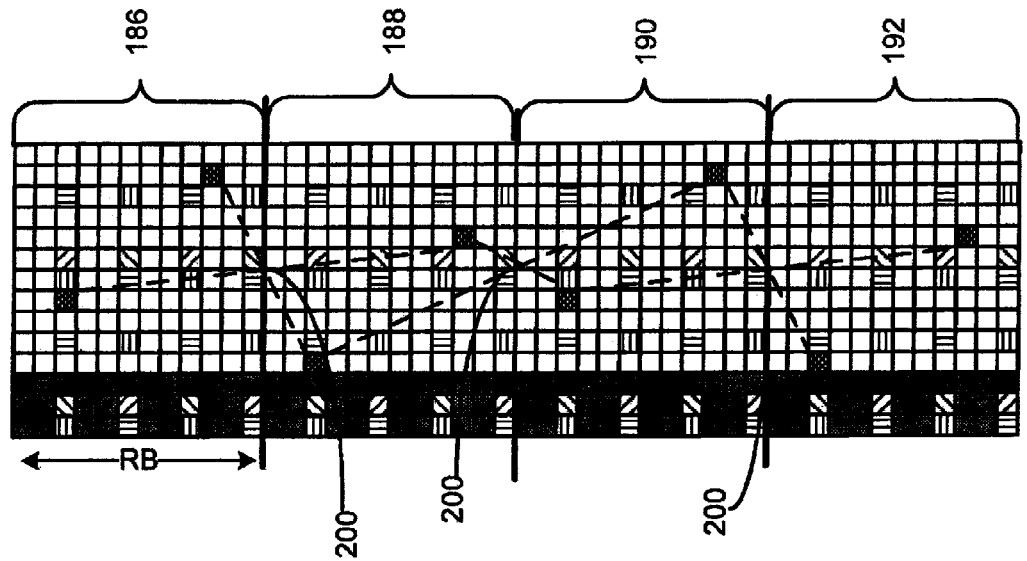
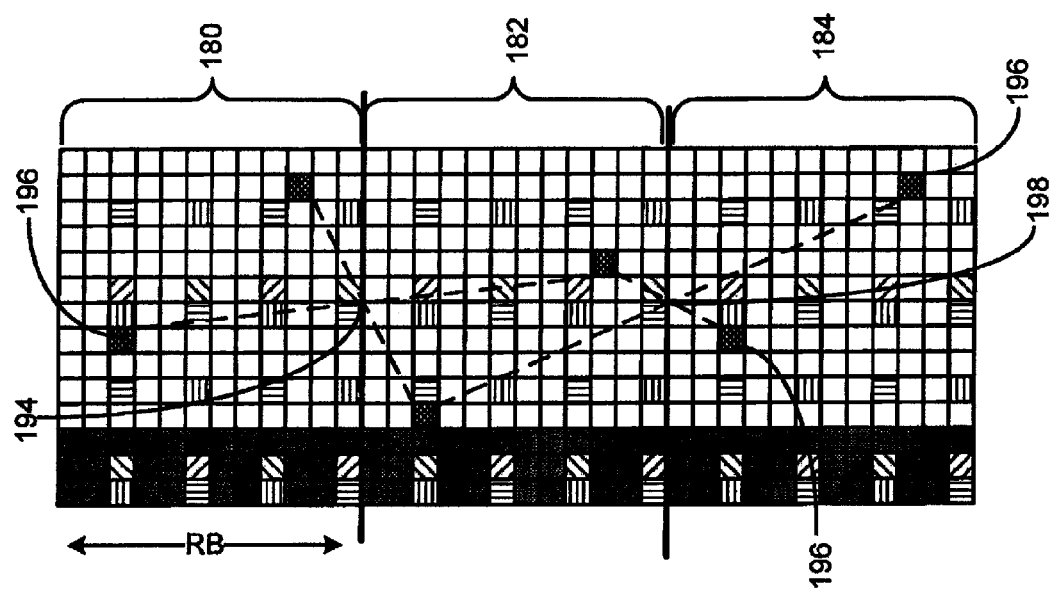
Fig. 8b
Fig. 8a
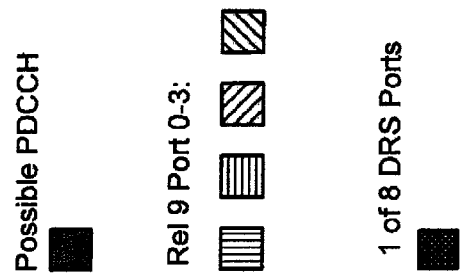

Possible PDCCH
Rel 8 Port 0-3:
1 of 8 DRS Ports

Possible PDCCH  Rel 8 Port 0-3:

1 of 8 DRS Ports

REFERENCE SIGNAL DESIGN FOR WIRELESS COMMUNICATION SYSTEM

CROSS-REFERENCE TO RELATED APPLICATIONS

The present application claims priority to U.S. provisional patent application No. 61/218,797 filed Jun. 19, 2009, by Dongsheng Yu, et al, entitled "Reference Signal Design For Wireless Communication System" (35762-US-PRV-4214-28400), which is incorporated by reference herein as if reproduced in its entirety.

BACKGROUND

The present invention relates generally to data transmission in mobile communication systems and more specifically to useful resource block reference signal patterns as well as systems and method for using the patterns.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" or "access device" will refer to any component, such as a traditional base station or an LTE or LTE-A base station (including eNBs), that can provide a UA with access to other components in a telecommunications system.

In mobile communication systems such as the E-UTRAN, a base station provides radio access to one or more UAs. The base station comprises a packet scheduler for dynamically scheduling downlink traffic data packet transmissions and allocating uplink traffic data packet transmission resources among all the UAs communicating with the base station. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a scheduling channel.

In LTE systems, data is transmitted from an access device to UAs via Resource Blocks (RBs). Referring to FIG. 1, an exemplary resource block 50 is illustrated that is comprised of 168 Resource Elements (REs) (see exemplary elements 52) arranged in twelve frequency columns and fourteen time rows as known in the art. Accordingly, each element corresponds to a different time/frequency combination. The combination of elements in each time row are referred to as an Orthogonal Frequency Division Multiplexing (OFDM) symbol. In the illustrated example the first three OFDM symbols (in some cases it may be the first two, first four, etc.) are reserved for PDCCH and are shown in FIG. 2 as gray REs collectively identified by numeral 56. Various types of data can be communicated in each RE.

LTE systems employ various types of reference signals to facilitate communication between an access device and a UA. A reference signal can be used for several purposes including, determining which of several different communication modes should be used to communicate with UAs, channel estimation, coherent demodulation, channel quality measurement, signal strength measurement, etc. Reference signals are generated based on data known to both an access device and a UA, and may also be referred to as pilot, preamble, training signals, or sounding signals. Exemplary reference signals include a cell specific or common reference signal (CRS) that is sent by a base station to UAs within a cell and is used for channel estimating and channel quality measurement, a UA-specific or dedicated reference signal (DRS) that is sent by a base station to a specific UA within a cell that is used for demodulation of a downlink, a sounding reference signal (SRS) sent by a UA that is used by a base station for channel estimation and channel quality measurement and a demodulation reference signal sent by a UA that is used by a base station for demodulation of an uplink transmission from the UA.

In LTE systems, CRS and DRS are transmitted by access devices in RB REs. To this end, see FIG. 2 which shows exemplary CRS (three of which are labeled 52) in vertical, horizontal, left down to right and left up to right hatching for ports 1 through 3 respectively and exemplary DRS in dark REs, three of which are labeled 54. The reference signals allow any UAs communicating with the access device to determine channel characteristics and to attempt to compensate for poor characteristics. The CRS reference signals are base station/cell specific and UA-independent (i.e., are not specifically encoded for particular UAs) and, in at least some cases, are included in all RBs. By comparing the received CRS to known reference signals (i.e., known data), a UA can determine channel characteristics (e.g., a communication quality index, etc.). The difference between the known data and the received signal may be indicative of signal attenuation, path-loss differences, etc.

UAs report channel characteristics back to the access device and the access device then modifies its output (i.e., subsequent REs) to compensate for the channel characteristics. To indicate how signal output is modified, the access device transmits UA specific DRS to each UA. Here again, DRS data is known at the UA and therefore, by analyzing received DRS, UA can determine how the access device output has been modified and hence obtain information required to demodulate data received in subsequent REs. In FIG. 2, exemplary CRS reference signals are indicated by hatching, DRS signals are indicated by dark REs and non-reference signal elements during which traffic data is transmitted are blank (i.e., white).

Referring again to FIG. 2, to avoid collisions LTE system DRS 54 are generally allocated to OFDM symbols separate from those occupied by CRS. Furthermore, DRS 54 are generally allocated away from PDCCH 56. In release 8 LTE devices (hereinafter "Rel-8 devices"), for example, DRS of antenna port 5 may be specified for PDSCH demodulation as shown in FIG. 2. In some cases, CRS 52 on antenna ports 0-3 are distributed on all RBs in the system bandwidth, while DRS 54 on antenna port 5, for example, may only be allocated in RBs assigned to a corresponding UA. When a UA is assigned two or more contiguous RBs, DRS 54 allocation may simply be repeated from one RB 50 to the next.

One contemplated LTE-A requirement is to reach a peak spectrum efficiency of 30 bps/Hz. To fulfill this requirement, the total RE overhead for DRS will likely be limited. As such, in one system implementation satisfying peak spectrum efficiency requirements, a maximum of 24 DRS REs may be allocated to up to 8 antenna ports. As a result, the average number of REs in one RB for each antenna port becomes relatively small. For instance, for 8 antenna ports, 3 REs per RB may be allocated for each of 8 DRS antenna ports. In another instance, for 8 antenna ports, 4 REs per RB may be allocated for each of 4 antenna ports, and 2 REs per RB may be allocated for each of another 4 antenna ports.

In either example, 2-3 REs per RB may be allocated to each of some or all antenna ports. In that case, with so few DRS REs allocated to each UA, channel characteristic estimation is difficult to maintain at reasonable quality and therefore high data rate demodulation is difficult to facilitate.

One method for a UA to improve channel estimation quality is to carry out channel estimation on contiguous RBs when contiguous RBs are assigned to a single UA. In some cases, the DRS pattern for these multiple RBs may be the repeated versions of a single RB pattern. However, as a result of the scarcity of available REs per antenna port in an RB, the DRS may not be well-distributed and, as a result, may not cover resource edges well. Two example DRS patterns are shown in FIGS. 3a and 3b for two RBs. In both FIGS. 3a and 3b, the DRS patterns are repeated in two separate RBs. Also, in both FIGS. 3a and 3b, REs 102 making up part of the DRS are not fully distributed in time. For example, in FIG. 3a, both DRS 102' are broadcast at exactly the same time and both DRS 102 are broadcast at exactly the same time.

Because DRS 102, 102' are not fully distributed in time, two problems can occur. First, there may be a problem with power balance among OFDM symbols if reference signals for different antenna ports are multiplexed in Frequency-Division Multiplexing (FDM) and Time-Division Multiplexing (TDM) fashion. Second, the edge of the assigned resource may not be covered well and extrapolation will therefore be needed for channel estimation, which may cause performance loss. In FIG. 3a, for example, four OFDM RE symbols are located at the edge of the RBs and would require extrapolation.

Therefore, a problem with existing reference signal design is the trade-off between channel estimation quality and overhead where multi-layer transmission is to be supported.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 8a and 8b are illustrations of DRS patterns using twin DRS patterns illustrated in FIGS. 5-7 applied to multiple RBs;

DETAILED DESCRIPTION

Figure 1:
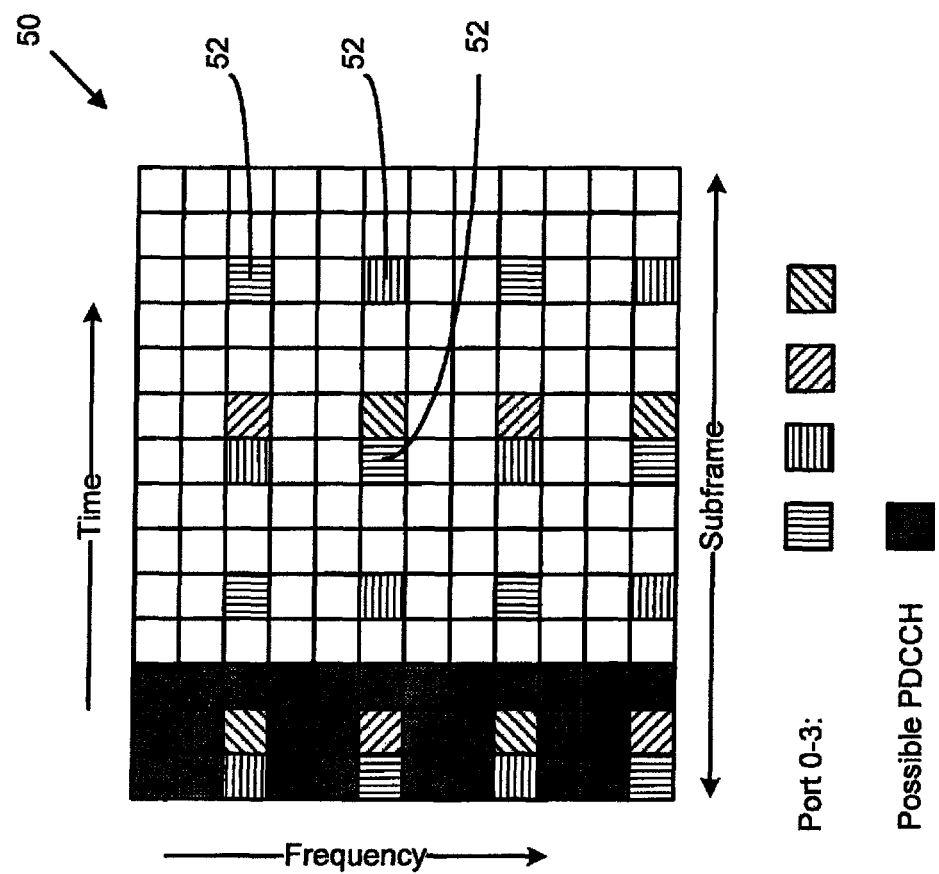
FIG. 1 illustrates a Resource Block (RB) including Resource Elements (REs) of a common reference signal (CRS) being distributed throughout the RB.

It has been recognized that reference signal (RS) patterns can be designed for contiguous Resource Blocks (RBs) associated with a single UA to improve the channel characteristic determining and compensation process in multi-layer transmission communication systems. To this end, where contiguous RBs are assigned to a single UA, a UA can be programmed to infer a CRS and DRS pattern from the number of contiguous RBs assigned to the UA so that no extra signaling of the pattern employed is required. In one embodiment, a UA can be programmed to infer a CRS and DRS pattern from the number of contiguous RBs and the start RB index assigned to the UA so that no extra signaling of the pattern employed is required. The UA can then use the inferred pattern to identify CRS and DRS for channel characteristic identification and demodulation information.

In some cases, a method is implemented for identifying a reference signal pattern in contiguous resource blocks received by a user agent (UA) in a wireless communication system where any of one through N contiguous resource blocks may be assigned to a UA. The method may be performed by a UA and comprise the steps of storing resource block reference signal patterns in a UA memory where the patterns include a separate reference signal pattern for each possible number of contiguous resource blocks that may be assigned to a UA, receiving a resource grant indicating a number contiguous resource block is assigned to the UA, and, based on the number of contiguous resource blocks assigned to the UA, identifying one of the reference signal patterns in the memory. The method includes using the identified one of the reference signal patterns to identify reference signals in contiguously received resource blocks. In some implementations, for two or more contiguous resource blocks, the reference signal pattern is symmetrical.

In other cases, a method for distributing reference signals in first and second resource blocks (RBs) of a wireless communication channel, the first and second RBs each including a plurality of resource elements (REs), being contiguous along at least one of a frequency domain and a time domain, and having a geometrical center comprises the steps of allocating a plurality of the REs of the first RB to the reference signal, and allocating a plurality of the REs of the second RB to the reference signal. The allocated REs of the first and second RBs may have a center of symmetry equal to the geometrical center of the first and second RBs combined. The method may include transmitting the first and second RBs using the wireless communication channel.

In other cases, a method for distributing reference signals in first and second resource blocks (RBs) of a wireless communication channel utilizing a plurality of antennas, the RB including a plurality of resource elements (REs), comprises the steps of assigning an index to each of the plurality of antennas, and defining a set of candidate REs of the RB to be allocated to the reference signal. The set of candidate REs are positioned within the RB in a plurality of rows. The method includes, for a first row of the set of candidate REs, allocating each of the REs in the first row to one of the plurality of antennas in an order of the index of each of the plurality of the antennas.

In other cases, a method for configuring a dedicated reference signal (DRS) pattern in a plurality of contiguous resource blocks (RBs) used in a wireless communication system comprises the steps of specifying a single RB DRS pattern, and using the single RB DRS pattern to derive a DRS pattern for a plurality of contiguous RBs that are assigned to a single user agent (UA) wherein the DRS pattern for each adjacent pair of RBs in the plurality is different.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The present system provides an improved reference signal design for DRS distributed within one or more RBs. The reference signals are configured to retain single RB DRS patterns when possible and to minimize the variety of options when implementing DRS patterns for multiple contiguous RBs. Accordingly, when a system employs DRS patterns for multiple contiguous RBs, implementation complexity is minimized.

Generally, the following examples may be applied to several different multiple antenna port multiplexing schemes of DRS including Time-Division Multiplexing (TDM), Frequency-Division Multiplexing (FDM), Code-Division Multiplexing (CDM) or combinations thereof. Similarly, the following system implementations may be applied to varying numbers of antenna, even though several examples use eight antennas. The phrase 'single RB' is a generic unit, referring to a minimum transmission unit. It may include one physical RB, multiple physical RBs, or a fraction of a physical RB. In the context of LTE and LTE-A, single RB may refer to one Physical Resource Block (PRB) pair. For example, RB may refer to a PRB pair in a subframe that span 12 REs in frequency and 2 slots in time.

Figure 4:
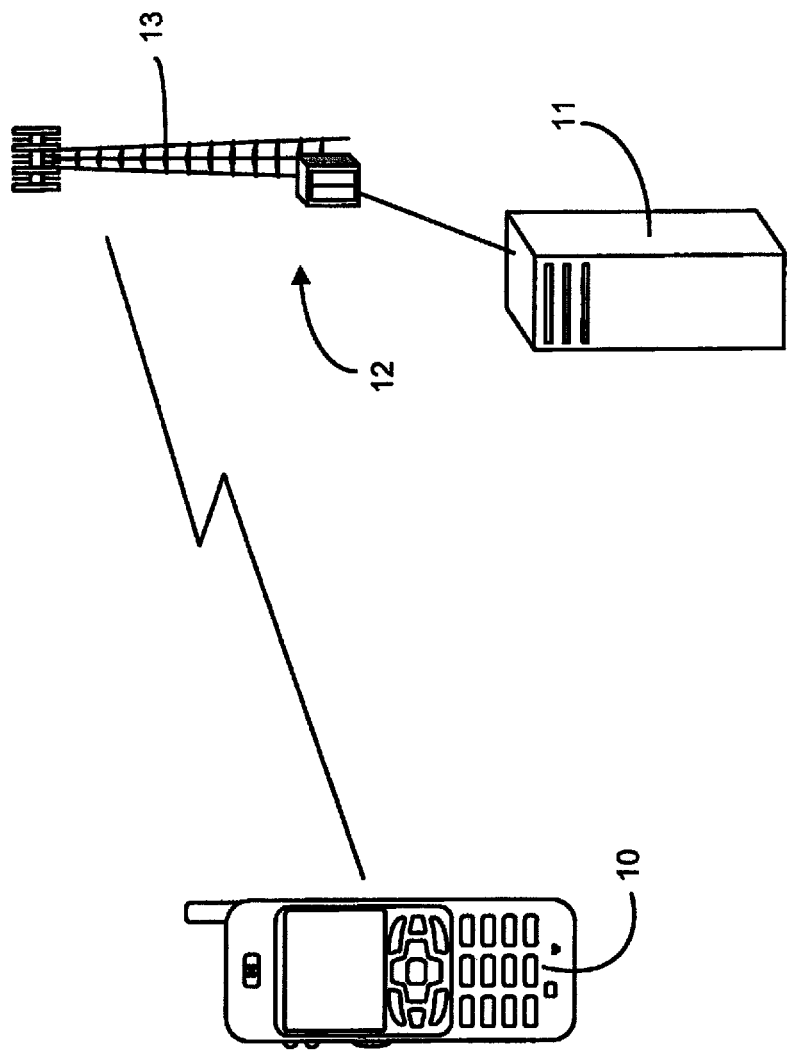
FIG. 4 is a schematic diagram illustrating an exemplary base station or access device that includes a processor linked to an antenna array.

FIG. 4 is a schematic diagram illustrating an exemplary base station or access device 12 that includes a processor 11 linked to antenna array 13. Exemplary system components include a user agent (UA) 10, and an access device 12 associated with a network cell. UA 10 includes, among other components, a processor 802 (see also FIG. 21) that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data. Access device 12, in one implementation, may include an E-UTRAN node B (access device 12) or other network component for communicating with UA 10.

To facilitate communications, a plurality of different communication channels are established between access device 12 and UA 10 including, among other channels, a Physical Downlink Control Channel (PDCCH) (not illustrated). As the label implies, the PDCCH is a channel that allows access device 12 to transmit control signaling to UA 10 to schedule downlink and uplink data communications. To this end, the PDCCH is used to transmit scheduling or control data packets referred to as DCI packets to UA 10 to indicate scheduling to be used by UA 10 to receive downlink communication traffic packets or transmit uplink communication traffic packets or specific instructions to the UA (e.g. power control commands, an order to perform a random access procedure, or a semi-persistent scheduling activation or deactivation).

Figure 2:
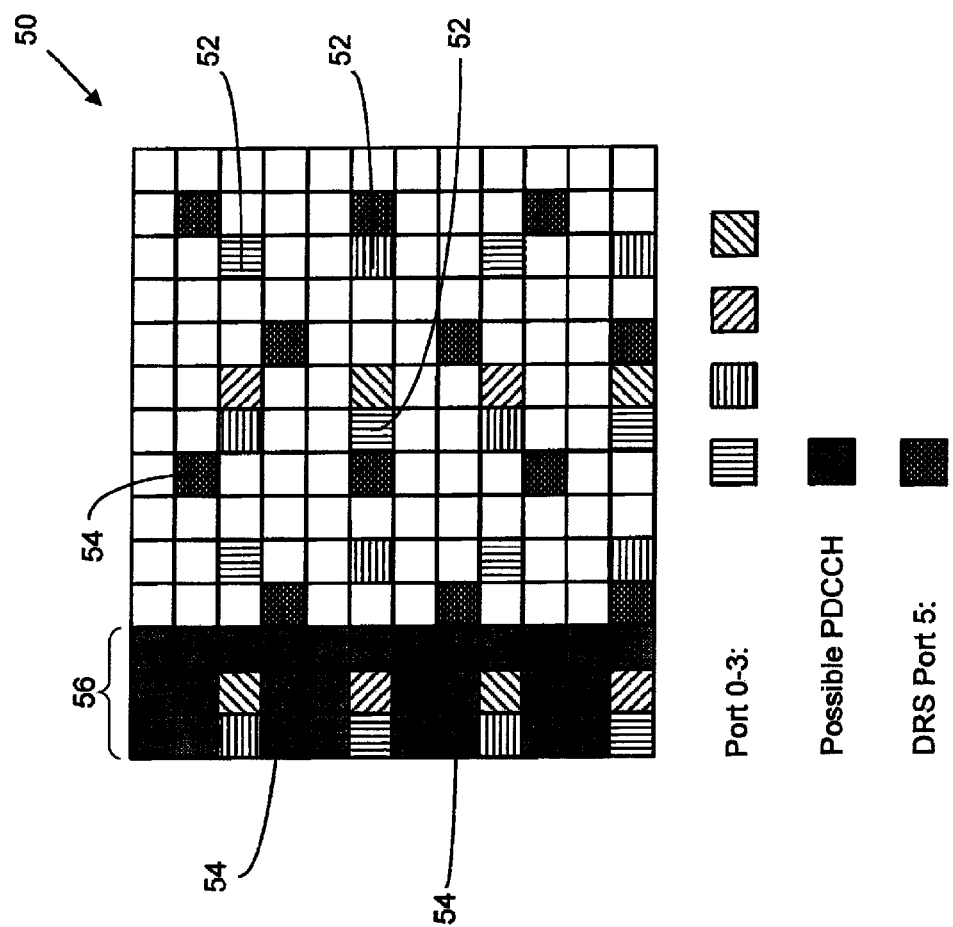
FIG. 2 illustrates a RB including both CRS and a plurality of Dedicated Reference Signals (DRSs) distributed throughout the RB.

Access device 12 transmits data to UA 10 via Resource Blocks (RB) like the block 50 shown in FIG. 2. Exemplary block 50 includes 168 Resource Elements (REs) 52 arranged in twelve frequency rows and fourteen time columns where each RE is associated with a unique time/frequency combination. RE's 56 are used for PDCCH and the balance represent the Physical Downlink Shared Channel (PDSCH).

Referring again to FIG. 4, access device 12 is configured to transmit reference signals for the downlink channels to facilitate communication between access device 12 and UA 10. The reference signals are used to determine and compensate for channel characteristics. In LTE-A, the reference signals include DRS and CRS.

In one implementation of the present system, when a UA is assigned resources using two contiguous RBs, the DRS pattern in a first RB is configured to be center-symmetric or have approximate center symmetry when compared to the DRS pattern in adjacent RBs. The center of symmetry may be located at the two-dimensional geometric center of the PDSCH region of the RBs assigned to the UA, assuming two PDCCH symbols are allocated in the subframe. In this implementation, the phrase 'center symmetric mapping' may also be described as '2-dimensional point reflection' or '180° rotation around the center'. The center of mapping may be at the geometric center of the region of interest, or a point near the geometric center. In view of the discrete nature of the RE grid for each RB and the limited location of available REs in general, the mapping may not be strictly symmetric, but close to strict symmetric.

FIGS. 5a and 5b illustrate a DRS pattern distributed across two RBs, the DRS pattern having a center symmetric mapping. The center of symmetry for the DRS pattern is the same as a center of the PDSCH regions of interest for both RBs combined. In FIGS. 5a and 5b, PDSCH 104 has a center at 106. Lines 108 extend between center-symmetrically distributed REs 110 of the DRS in RBs 101 and 103. The crossing point for each of lines 108 indicates a center of symmetry for the DRS pattern formed across RBs 101 and 103. Because lines 108 each cross at center region 106, the distribution of DRS REs 110 amongst RBs 101 and 103 is center symmetric. For example, the position of each RE in RB 103 may be a point reflection with respect to center point 106 of each RE in RB 103. In other words, each DRS RE in RB 103 may be positioned by a 180° rotation around center point 106 from each DRS RE in RB 101. As can be seen in FIGS. 5a and 5b, REs 110 are not positioned above one another. As a result, REs 110 are distributed to different OFDM symbols in time.

Figure 6:
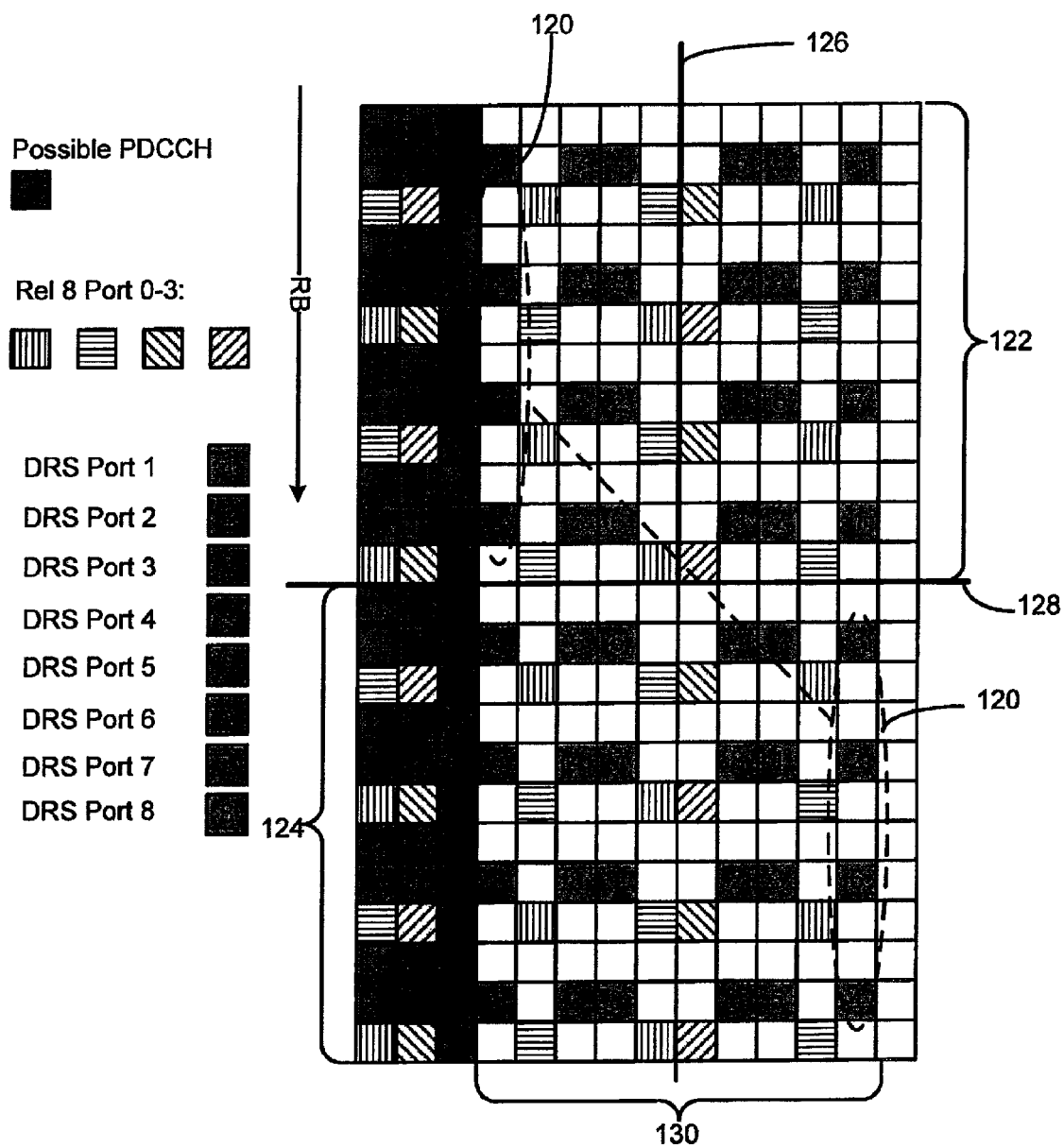
FIG. 6 illustrates a DRS pattern wherein the DRS REs in one Orthogonal Frequency-Division Multiplexed (OFDM) symbol of an RB are center-symmetrically mapped to an adjacent RB.

In another implementation of the present system, all DRS REs in an OFDM symbol of one RB may be center-symmetrically mapped to an adjacent RB as a group. This type of mapping can also be realized by reflecting a first RB pattern about a center line of the RB (in these examples, the center line denotes the center of the PDSCH of the RB). For example, FIG. 6 illustrates a DRS pattern wherein the DRS REs in one OFDM symbol of an RB are center-symmetrically mapped to an adjacent RB. In FIG. 6, center line 126 indicates a center of the PDSCHs of RBs 122 and 124 with respect to time. In this example, DRS REs in OFDM symbol group 120 in RB 122 are reflected about center line 126 in RB 124. When constructing RB 124, therefore, the position of each OFDM symbol group in RB 124 is determined by the position of each OFDM symbol group within RB 122. Each collection of REs included within an OFDM symbol grouping of RB 122 is reflected directly across line 126 to be positioned within RB 124. Accordingly, the point of symmetry of the OFDM symbol groupings in both RB 122 and 124 combined lies at an approximate center 130 of the PDSCH regions of RBs 122 and 124.

Figure 7:
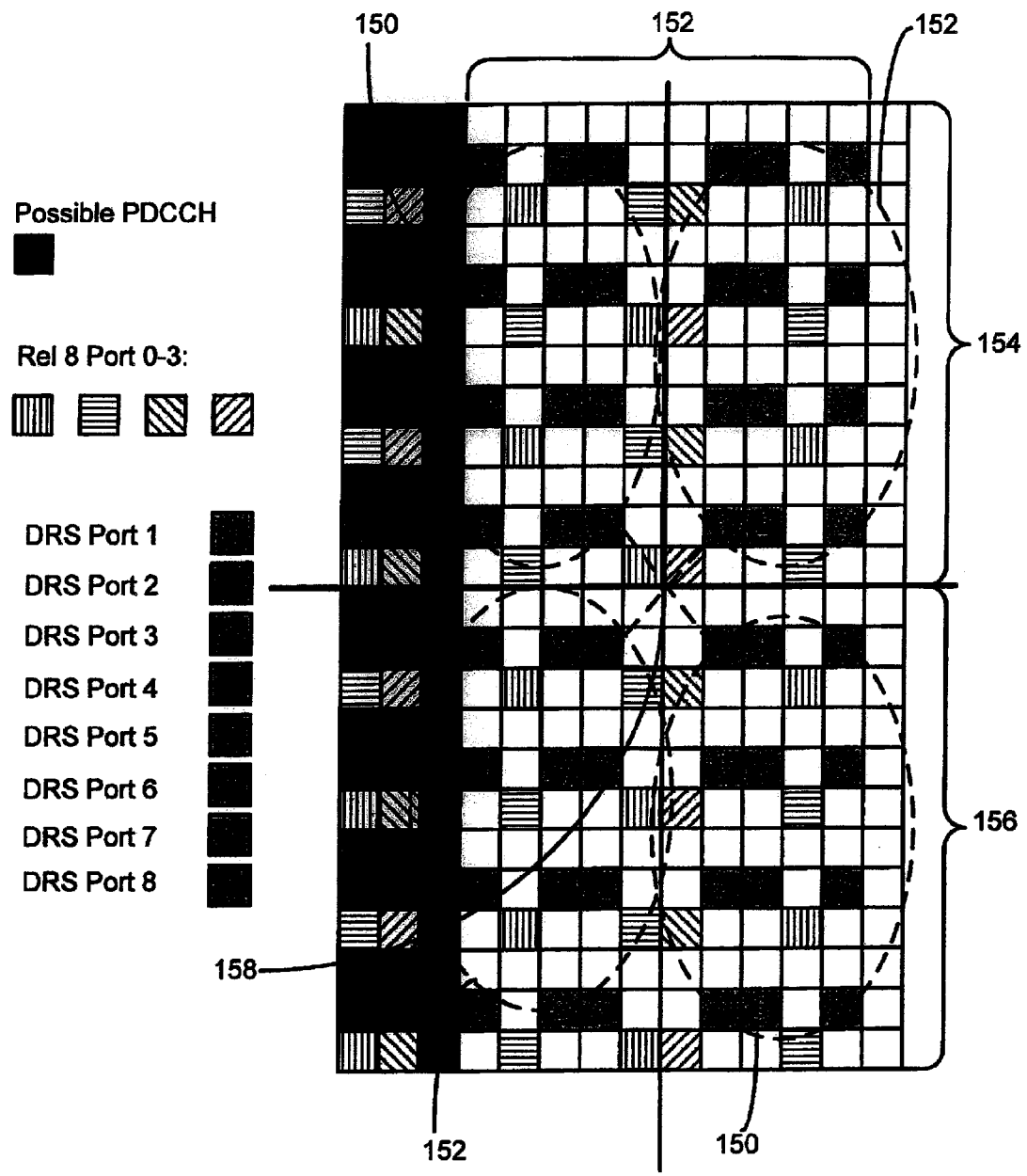
FIG. 7 illustrates a reference signal configuration where each RB is split into two groupings, and each grouping is center-symmetrically mapped to an adjacent RB by reflection across a center line of the RBs.

Alternatively, rather than reflect each OFDM symbol grouping independently, all DRS REs in one half of a first RB may be center-symmetrically mapped to an adjacent RB as a group in a second RB. FIG. 7 illustrates a reference signal configuration where each RB is split into two groupings, and each grouping is center-symmetrically mapped to an adjacent RB by reflection across a center line of the RBs. For example, the PDSCH region 152 of RB 154 is separated into two groupings 150 and 152. When constructing RB 156, the DRS REs from group 150 are center-symmetrically mapped onto RB 156 by reflection across a center line of RB 154. Accordingly, grouping 150, which occupied the left half of the PDSCH region 152 of RB 154 occupies the right half of the PDSCH region 152 of RB 156 when center-symmetrically mapped onto RB 156. A similar algorithm determines the positioning of grouping 152. As shown by point 158, the center point of groupings 150 and 152 is located at the approximate geometrical center of RBs 154 and 156 combined.

The example DRS patterns described above focus primarily on the construction of reference signals in pairs of RBs. The reference signal algorithms described above, however, may be extended to more than 2 consecutive RBs. In one embodiment, for an even number of contiguous RBs, the twin DRS patterns described above may be repeated from a first two contiguous RBs into additional contiguous RBs. When extending the DRS patterns as described in the present system, any two contiguous RBs may be configured to have a center-symmetric DRS pattern structure. In another embodiment, for an odd number or any number of contiguous RBs, each of two different patterns selected from the DRS patterns above may be allocated alternatively. The DRS pattern chosen for the first allocated RB to the UA can be derived from the RB index.

Figures 3A, 3B:
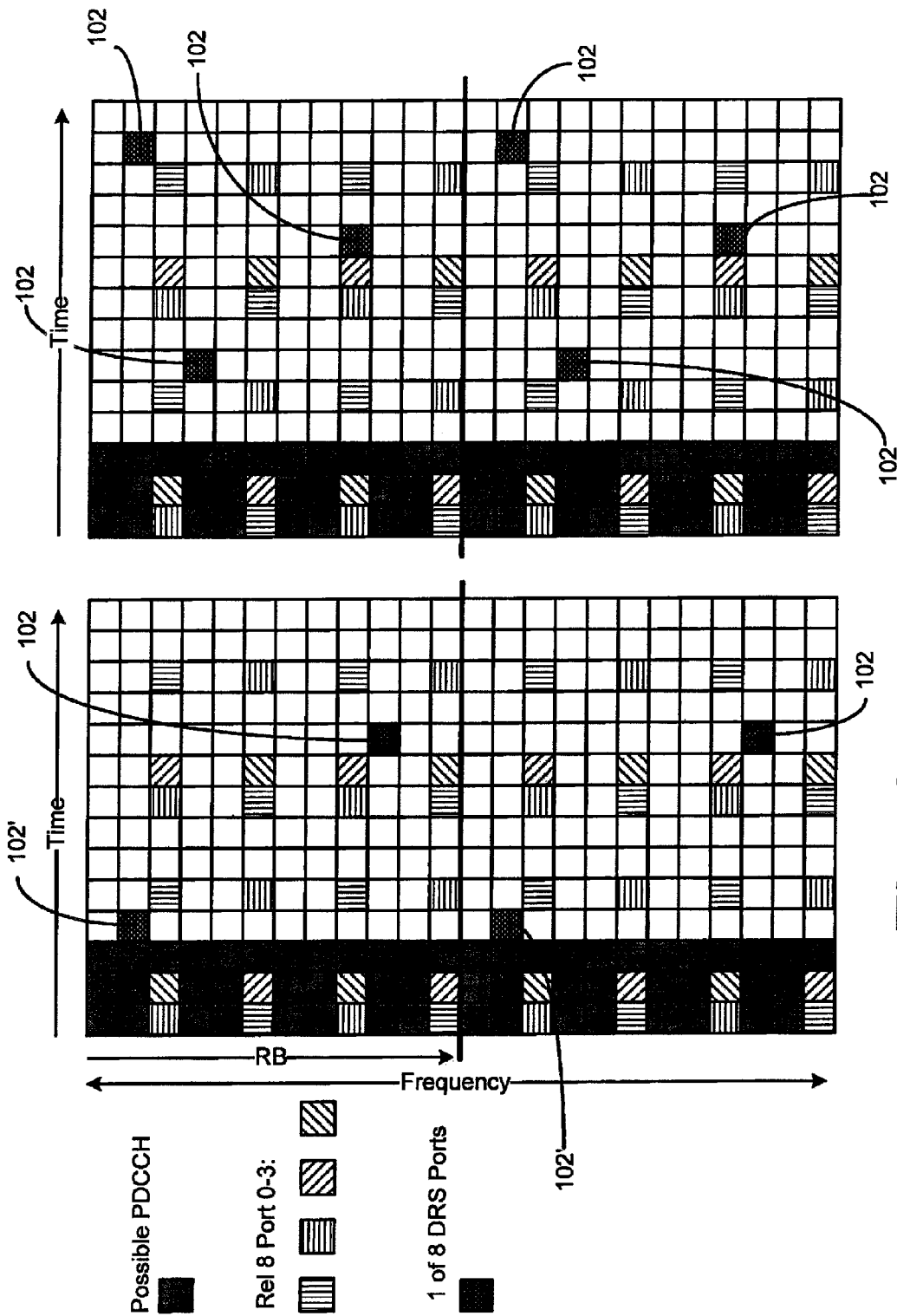
FIGS. 3a and 3b are illustrations of two example DRS patterns that are repeated across two separate RBs.
Figure 5:
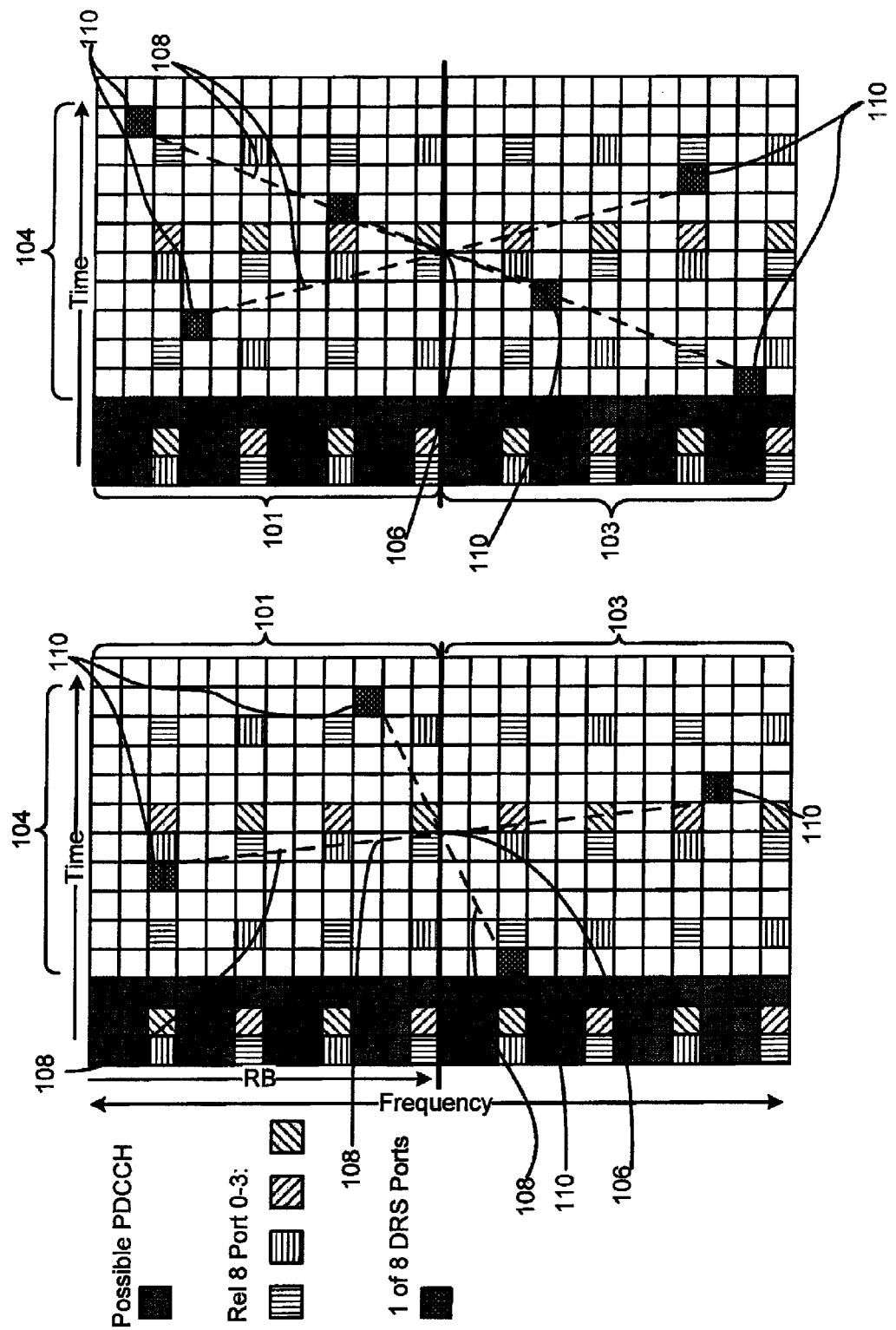
FIGS. 5a and 5b illustrate a DRS pattern distributed across two RBs, the DRS pattern having a center symmetric mapping.

FIGS. 8a and 8b are illustrations of DRS patterns using the twin DRS patterns illustrated in FIGS. 5-7 as applied to multiple (more than 2) RBs. In FIG. 8a, 3 RBs 180, 182 and 184 are shown. In RB 180, two example DRS REs are shown as the DRS of one of 8 antenna ports. In RB 182, REs 196 of RB 180 are reflected by a center point of the RB pair 180 and 182. As a result, and as shown by center point 194, REs 196 are center-symmetrically mapped across RBs 180 and 182.

Similarly, the REs 196 in RB 184 are center-symmetrically mapped from the RE 196 positions in RB 182. To generate the DRS pattern in RB 184, the REs 196 of RB 182 are again reflected by a center point of the RB pair 182 and 184. As a result, and as shown by center point 198, REs 196 are center-symmetrically mapped across RBs 182 and 184.

FIG. 8b illustrates a similar algorithm for constructing the DRS pattern of RBs 186, 188, 190 and 192. Moving through each RB, the REs of the DRS in the preceding RB are reflected across a center point of the RB pair consists of the preceding RB and the next RB. As a result, the REs in any pair of RBs are center-symmetrically mapped to one another as indicated by center points 200. Alternatively, as FIG. 8b includes an even number of RBs, the resulting DRS pattern is constructed by duplicating RB pair 182 and 186 to RB pair 190 and 192.

Note that the examples shown in FIGS. 8a and 8b may be duplicated for a plurality of RBs that are contiguous over the time domain. In that case, the DRS REs may be reflected across a center line of each RB, with the center line being a center of the RBs with respect to frequency.

In a general application of the above examples, for $N_{RB}^{PDSCH}$ resource blocks assigned to a UA having an index $n_{PRB}=0, 1, \ldots, N_R^{PDSCH}-1$, reference signal locations for each antenna port can be derived from the reference signal locations for corresponding antenna ports in the first of the assigned resource blocks for the UA. In one embodiment, the reference signal locations in the first of the assigned RB for the UA can be derived from the physical index of the RB with a subframe. Given reference symbol location $\{k,l\}^{(p)}$ at sub carrier k and OFDM symbol l for antenna port p defined in the first RB, $n_{PRB}=0$, reference signal locations $\{k',l'\}^{(p)}$ for the subsequent RBs can be derived according to the following equations:

$$k' = \begin{cases} n_{PRB}N_{sc}^{RB} + k & \text{if } n_{PRB}\bmod 2 = 0 \\ 2n_{PRB}N_{sc}^{RB} - k - 1 & \text{if } n_{PRB}\bmod 2 = 1 \end{cases} \quad \text{Eq (1)}$$

$$l' = \begin{cases} l & \text{if } n_{PRB}\bmod 2 = 0 \\ N_{symb}^{DLSF} - l + 1 & \text{if } n_{PRB}\bmod 2 = 1 \end{cases} \quad \text{Eq (2)}$$

where $N_{symb}^{DLSP}$ is the number of OFDM symbols in a downlink subframe, $N_{sc}^{RB}$ is the resource block size in the frequency domain, expressed as a number of subcarriers. Eq(1) and Eq(2) may apply to twin RB DRS patterns with any number of contiguous RBs in the frequency domain, including those pattern configurations described above.

Although twin DRS patterns may be derived from any DRS pattern for a single RB (for example, by reflecting each RE by a center point of RB pair from the first RB into the second RB), certain DRS patterns for a single RB may be preferred for constructing twin DRS patterns. For example, in twin DRS patterns, each DRS pattern of a single RB should be eligible for transmission in isolation from other RBs. Also, REs for each antenna port may be evenly distributed in both the single RB DRS pattern and the twin RB DRS pattern.

FIGS. 9a and 9b and FIGS. 10a and 10b illustrate reference signal patterns that are configured to be transmitted in isolation (as a single RB) or in combination with other RBs. The REs in each RB are evenly distributed in both the single RB DRS pattern and the combination, or twin, RB DRS patterns of two RBs.

Figure 9A:
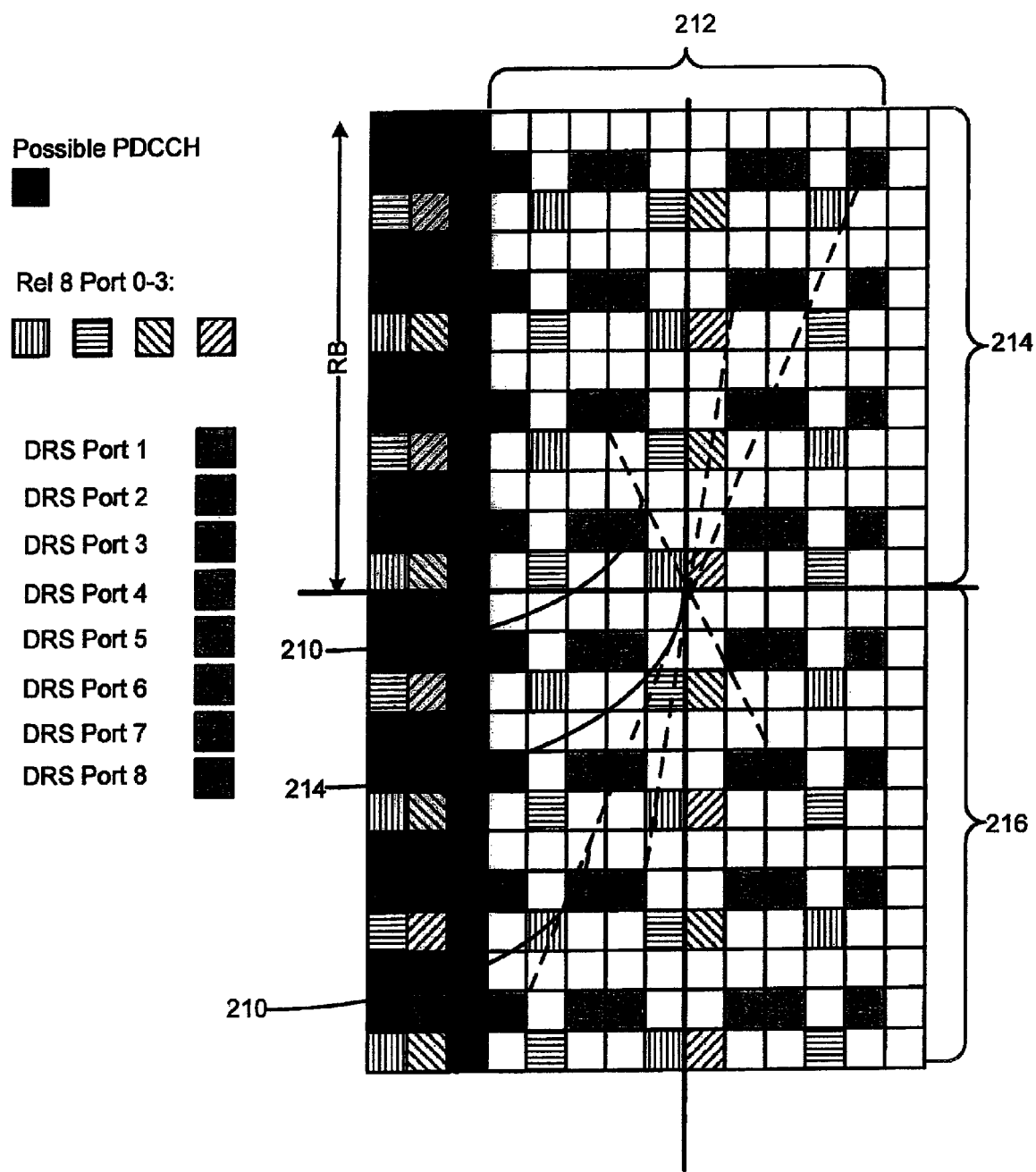
FIGS. 9a and 9b illustrate reference signal patterns that are configured to be transmitted in isolation (as a single RB) or in combination with other RBs.
Figure 9B:
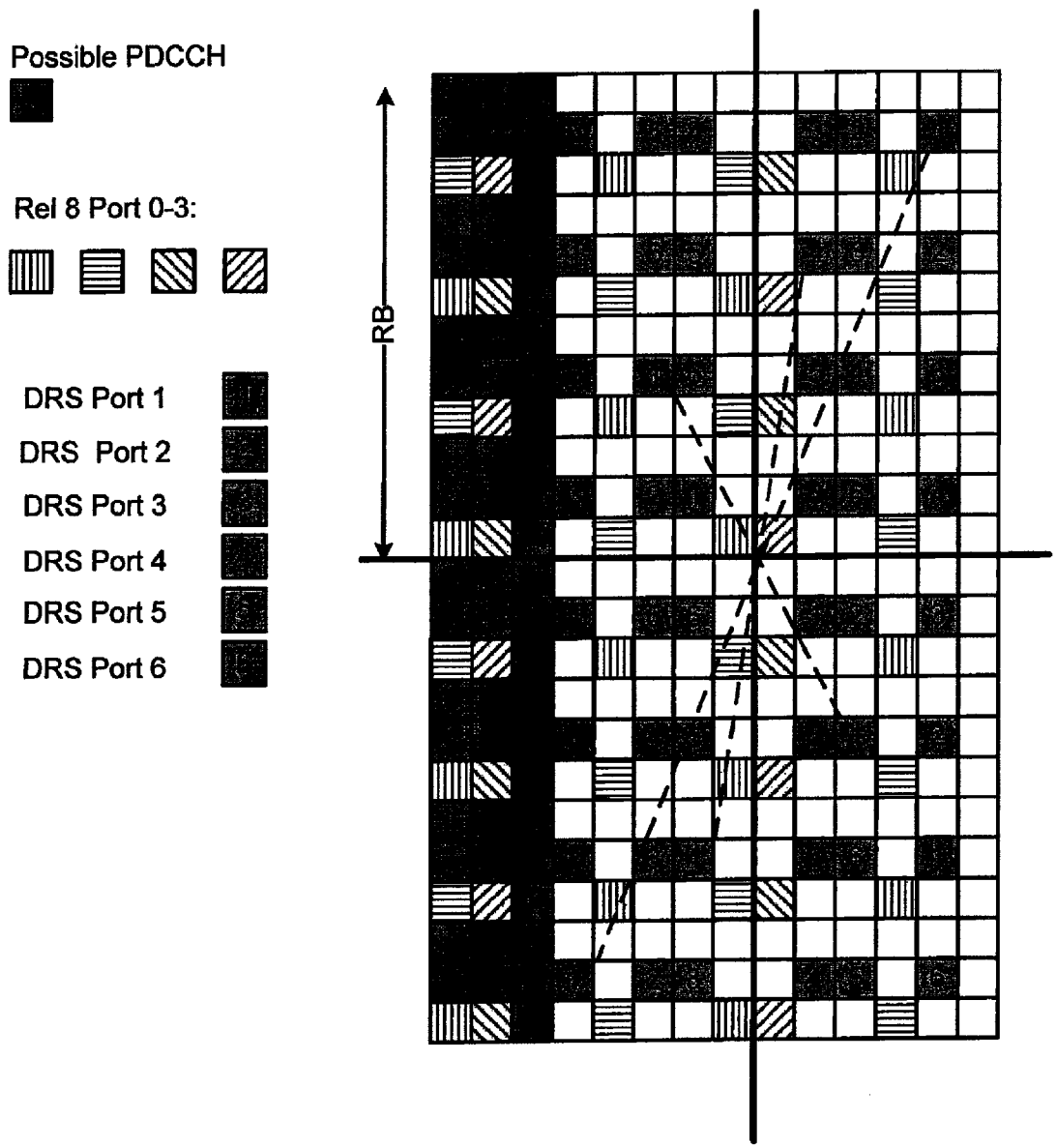
Figure 10A:
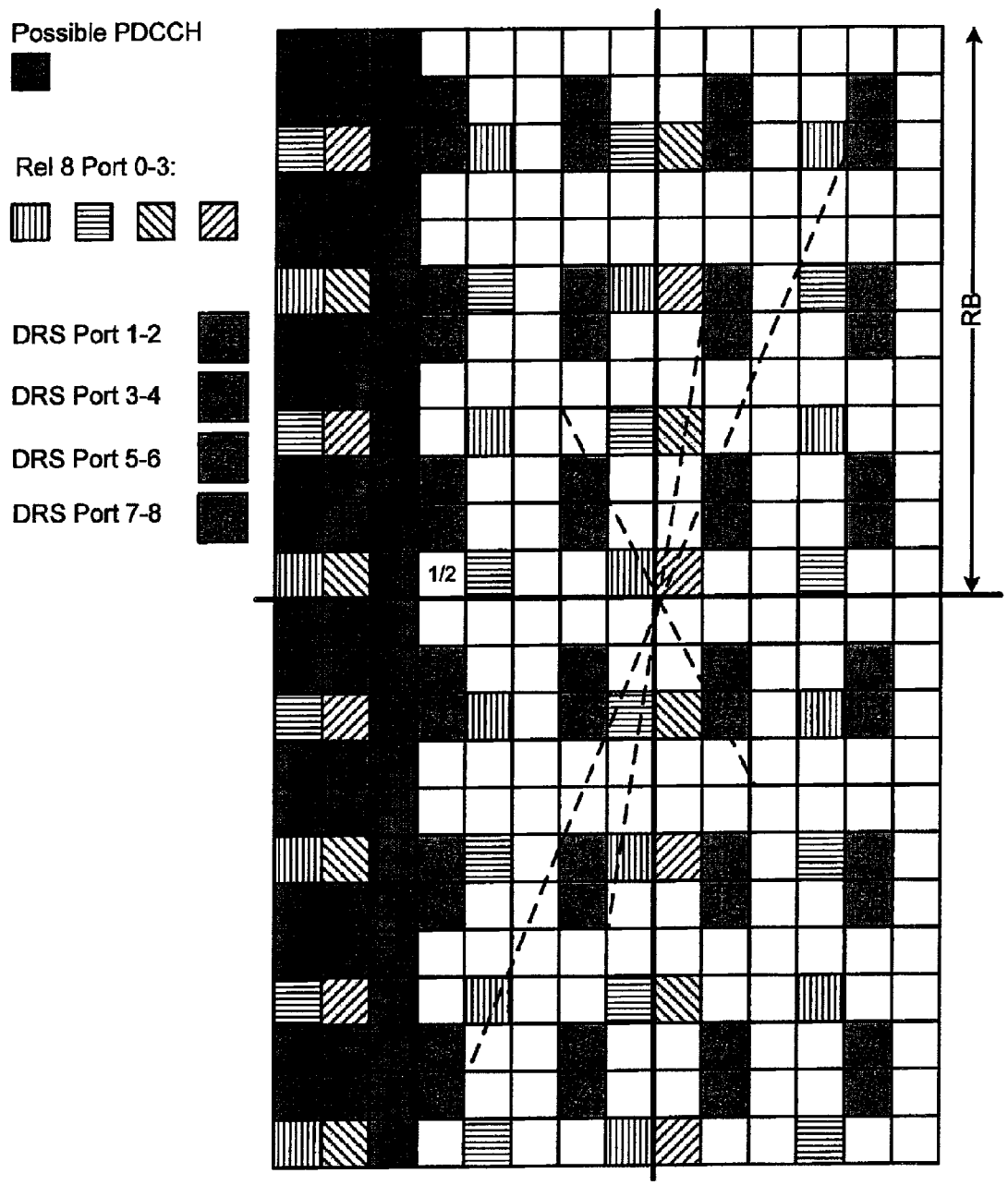
FIGS. 10a and 10b illustrate DRS pattern configurations for Code-Division Multiplexing (CDM) implementations.
Figure 10B:
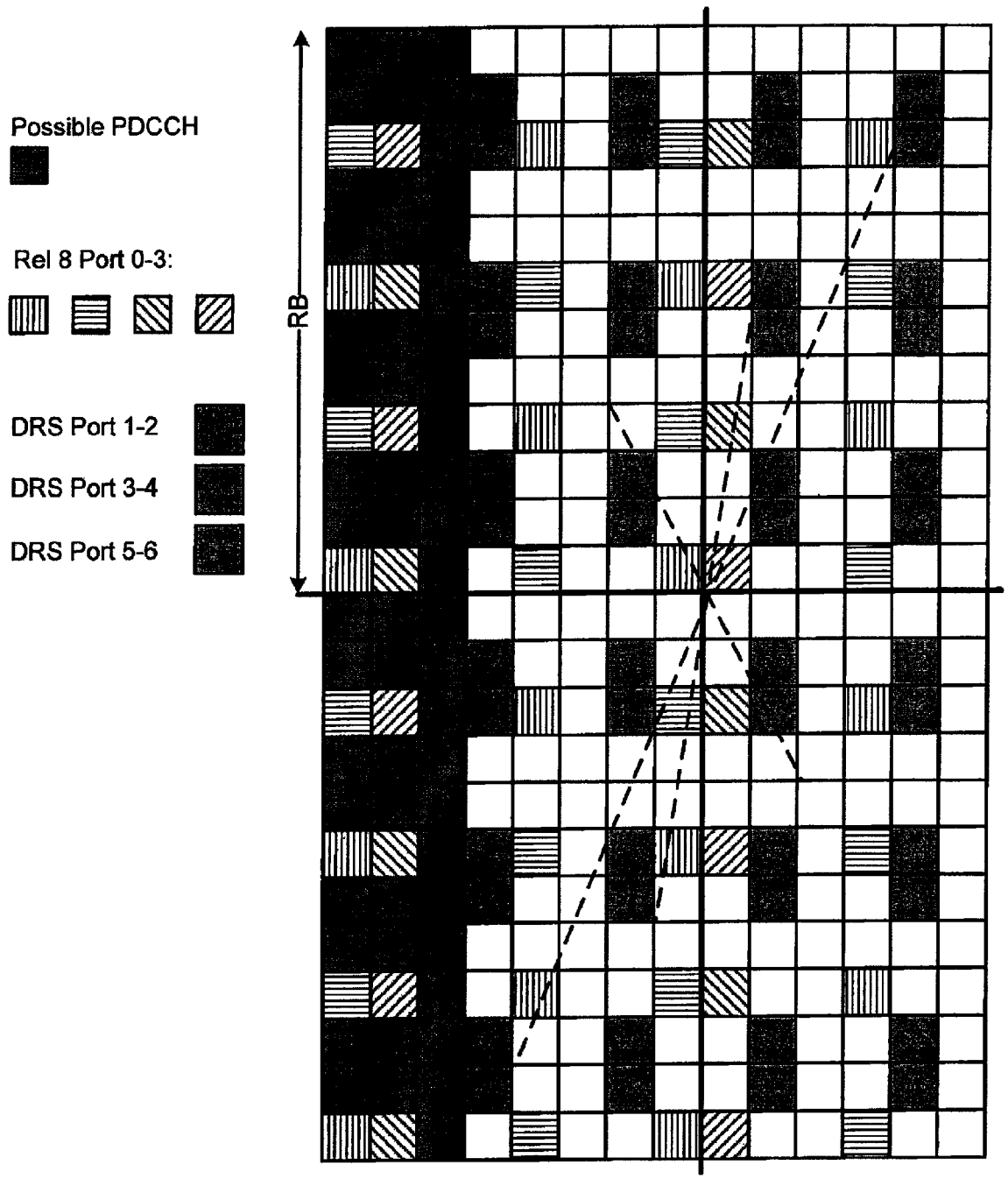

For example, FIG. 9a illustrates joint DRS pattern designs for distribution in a single RB or in twin RBs. In FIG. 9a, to construct the DRS pattern of RB 216, the REs of RB 214 are reflected about a center point of the PDSCH 212 of RB pair 214 and 216. As a result, and as indicated by center point 214, the REs of the DRS of RB 214 are center-symmetrically mapped to the REs of the DRS of RB 216. FIG. 9b illustrates a reference signal pattern for distribution in a single RB or in twin RBs for 6 layers with the DRS REs of the first RB being reflected about a center point of the PDSCH of the RB pair. FIGS. 10a and 10b illustrate similar DRS pattern configurations for a Code-Division Multiplexing (CDM) implementation. FIG. 10a illustrates the DRS pattern configurations for 8 layers, while FIG. 10b illustrates the DRS pattern configurations for 6 layers.

In some implementations of the present system, DRS pattern configurations based upon additional available RBs may be implemented. Too many potential DRS configurations, however, may introduce significant implementation complexity. As a result, a limited number of single RB DRS patterns may be allocated in a particular implementation of the present system. Furthermore, in addition to twin DRS patterns, triple DRS patterns may improve DRS performance while limiting the additional implementation complexity.

Figure 11:
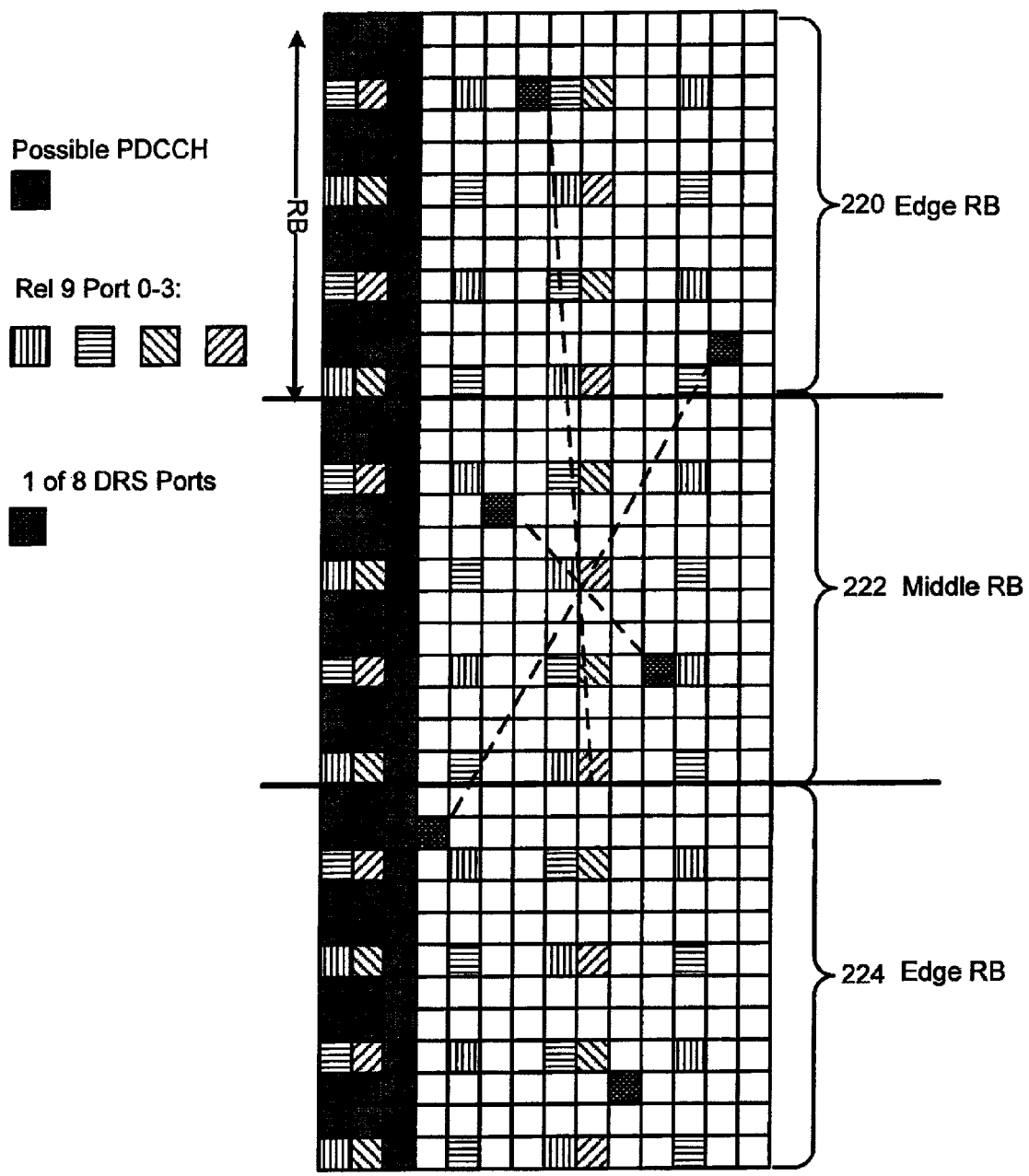
FIG. 11 illustrates a triple DRS pattern configuration having three contiguous RBs with two edge RBs and one middle RB.

FIG. 11 illustrates a triple DRS pattern configuration having three contiguous RBs with two edge RBs 220 and 224 and one middle RB 222. The edge RBs 220 and 224 share a first, center symmetrical, DRS pattern, while middle RB 222 has a second DRS pattern. The two edge RBs 220 and 224 patterns form a twin DRS pattern as described above for the twin DRS pattern implementations. The middle RB 222 is configured to include a complementary pattern to further enhance the overall channel estimation quality. For the three RBs 220, 222 and 224, center symmetry is provided for the middle RB 222, although center symmetry for the middle RB is not necessary. In the example shown in FIG. 11, the DRS pattern in middle RB 222 is configured to make the DRS evenly distributed across more OFDM symbols.

Depending upon the system implementation, DRS patterns may be extended across more than three RBs. For example, when a number of contiguous RBs across the frequency domain is a multiple of 3, the DRS pattern may be repeated for every 3 RBs. When a number of contiguous RBs is a multiple of 6, two different DRS pattern configurations may be applied for different groupings of RBs, for example, by repeating a triple DRS pattern every 3 RBs, repeating twin DRS patterns (two edge RBs) every 2 RBs, or by implementing a combination of triple DRS patterns and twin DRS patterns.

In some system implementations, it may be advantageous to provide a method for implicitly signaling the DRS pattern that is used for an arbitrary number of contiguous (in frequency) RBs. In the following example methods, N is the total number of contiguously allocated RBs. If N=1, then the system uses a single DRS pattern. If N=2, the system uses one twin DRS pattern. If N=3, the system uses one triple DRS pattern. When N is greater than or equal to 4, the system may apply the following rules. If N mod 3=0, the system uses N/3 triple DRS patterns. If (N−1) mod 3=0, the system uses two twin DRS patterns and (N−4)/3 triple DRS patterns. Finally, if (N−2) mod 3=0, the system uses one twin DRS pattern and (N−2)/3 triple DRS patterns.

When applying the rules for implicit signaling, there may be a question as to where twin DRS pattern(s) should be located with respect to any triple DRS patterns. In one case, each twin DRS pattern may be placed in the outermost two RBs at each edge of the resource block allocation for the UA. Alternatively, the twin DRS pattern may be placed into the center of the resource block allocation (with the recognition that the number of triple DRS patterns may be odd, so a perfectly "central" location may not exist). Alternatively, other pre-defined rule(s) for determining the location of any twin DRS pattern(s) may be defined.

In many OFDM system implementations, the RBs allocated to a particular UA may be contiguous in both frequency and time (if allocated over multiple subframes). When the number of RBs assigned to a UA increases, an improved reference signal design may be possible by jointly considering DRS patterns on multiple RBs. For four contiguous RBs with two RBs being contiguous in the frequency direction and two RBs being contiguous in the time direction, several design options may be derived from the DRS pattern of a single RB. First, a twin DRS pattern is derived from the DRS pattern of a single RB, either in frequency or in time direction. Second, the twin DRS pattern is repeated in the time direction (if the first twin DRS pattern is oriented in the frequency direction), or repeated in the frequency direction (if the first twin DRS pattern is oriented in time direction).

Figures 12A, 12B:
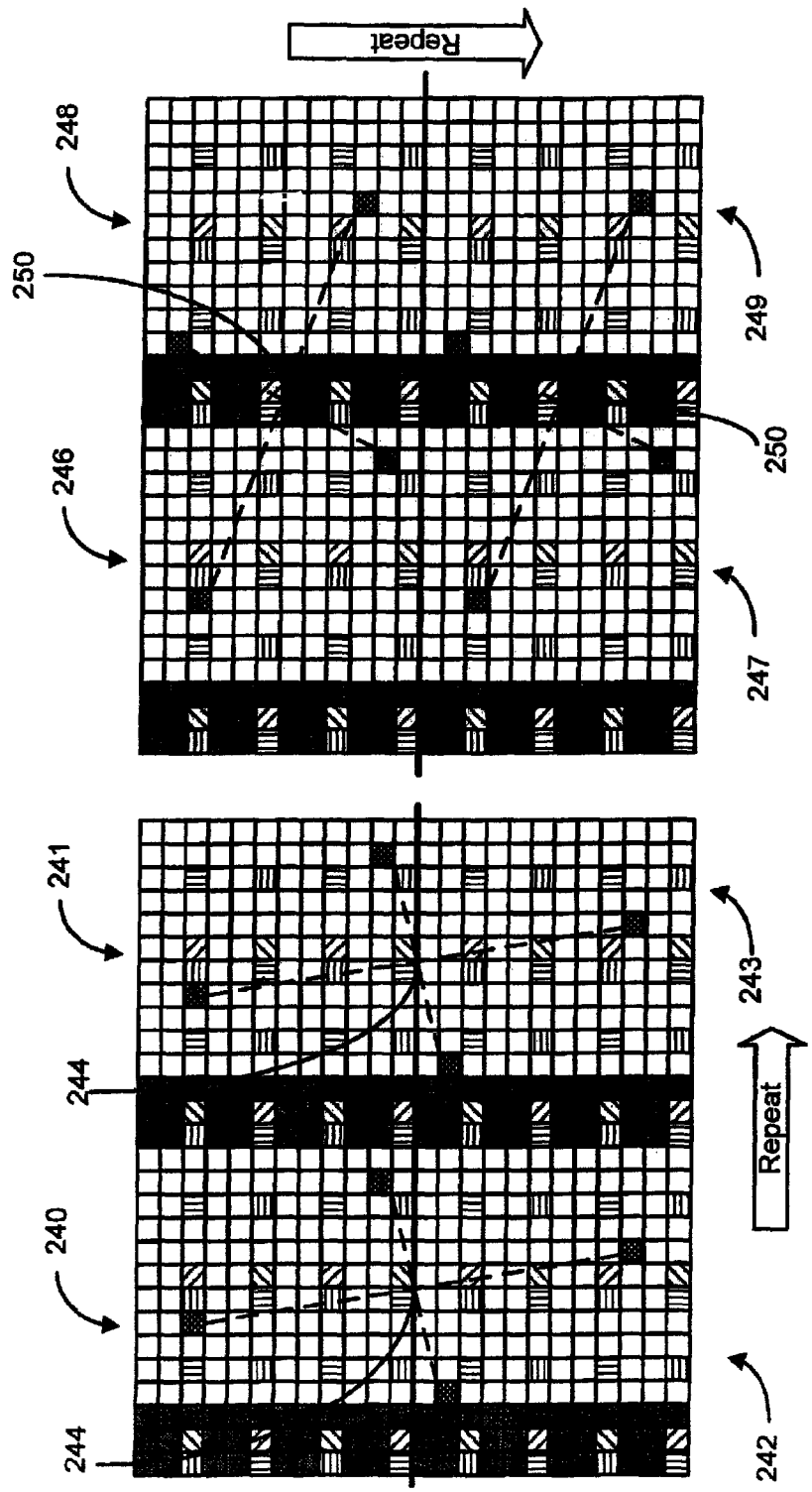
FIGS. 12a and 12b illustrate DRS patterns wherein the DRS patterns of a first RB pair are repeated into RBs that are contiguous in both the frequency and time domain.

FIGS. 12a and 12b illustrate DRS patterns wherein the DRS patterns of a first RB pair are repeated into RBs that are contiguous in both the frequency and time domain. In FIG. 12a, RBs 240 and 242 form twin DRS patterns in the frequency domain. As shown by center points 244, each of the DRS REs in RB 240 are center-symmetrically mapped to the DRS REs in RB 242. The twin DRS pattern is then repeated across the time domain from RBs 240 and 242 on the left, to RBs 241 and 243 on the right. In contrast, in FIG. 12b, RBs 246 and 248 form twin DRS patterns in the frequency domain. As shown by center points 250, each of the REs in RB 246 are center-symmetrically mapped to the REs in RB 248. The twin DRS pattern is then repeated across the time domain from RBs 246 and 248 on the top, to RBs 247 and 249 on the bottom.

Alternatively, rather than duplicate the twin DRS patterns across multiple RBs across the time or frequency domains, the twin DRS pattern may be reflected from a first pair of RBs to a second pair of RBs. First, a twin DRS pattern is derived from a DRS pattern of a single RB, either in the frequency or time direction. Second, the twin DRS pattern is reflected in the time direction (if the twin DRS pattern from the first step is oriented in the frequency direction), or is reflected in the frequency direction (if the twin DRS pattern from the first step is oriented in the time direction).

Figures 13A, 13B:
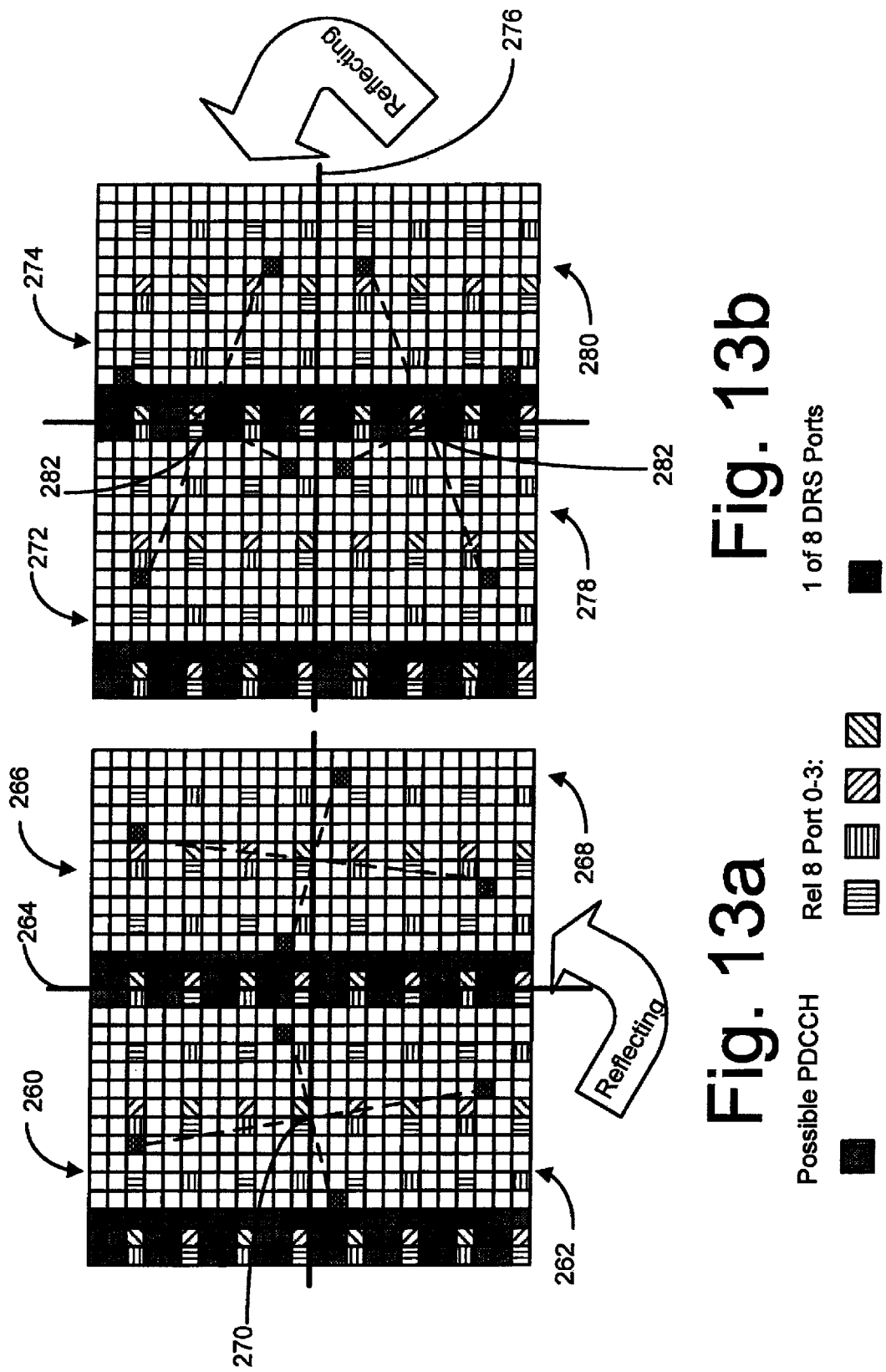
FIGS. 13a and 13b illustrate DRS patterns wherein the DRS patterns from a first pair of RBs are reflected into RBs that are contiguous in both the frequency and time domain.

FIGS. 13a and 13b illustrate DRS patterns wherein the DRS patterns from a first pair of RBs are reflected into RBs that are contiguous in both the frequency and time domain. In FIG. 13a, RBs 260 and 262 form a twin DRS pattern in the frequency domain. The DRS pattern of RBs 260 and 262 is then reflected across the subframe boundary 264 to form a new twin DRS pattern in RBs 266 and 268. As shown by center points 270, each of the DRS REs in RB pairs 260/262 and 266/268 are center-symmetrically mapped to one another. In FIG. 13b, RBs 272 and 274 form a twin DRS pattern in the time domain. The DRS pattern of RBs 272 and 274 is then reflected across the RB boundary 276 to form a new twin DRS pattern in RBs 278 and 280. As shown by center points 282, each of the REs in RB pairs 272/274 and 276/278 are center-symmetrically mapped to one another.

Alternatively, in the case of four contiguous RBs with two RBs being contiguous in the frequency direction and two RBs being contiguous in the time direction, a single RB DRS pattern may be mapped to the other three RBs by using center symmetric mapping using reflection across the RB boundaries in both the time domain and the frequency domain. The symmetric center is the center of the combined PDSCH region (in this example, over all four RBs), which may also include the PDCCH region of the RBs. The reflection line in the time domain may be the RB boundary and the reflection line in frequency domain may be the subframe boundary.

Figure 14:
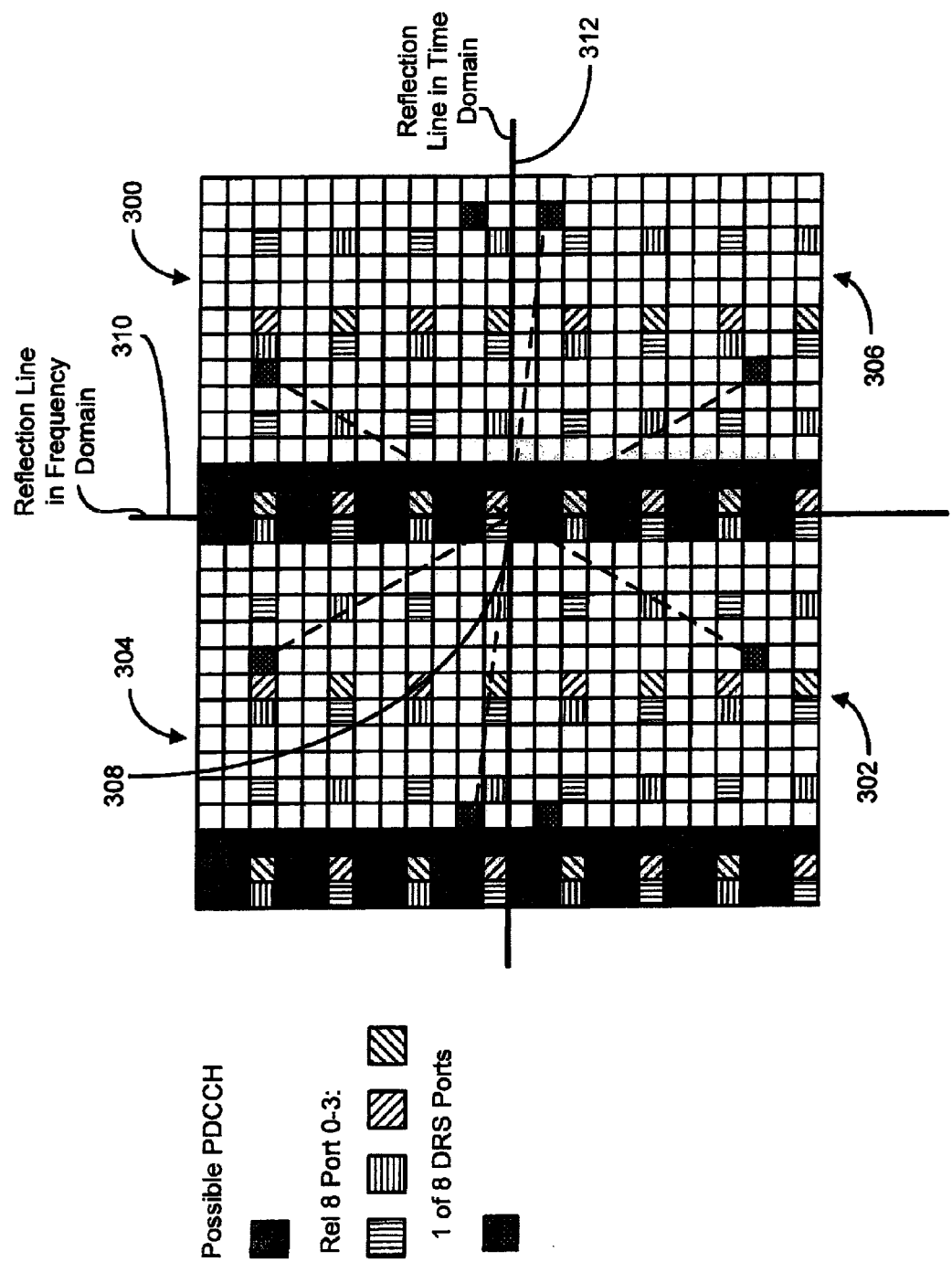
FIG. 14 illustrates a center symmetric DRS pattern for a combination of four contiguous RBs, with two RBs contiguous in the frequency domain and two RBs contiguous in the time domain.

FIG. 14 illustrates a center symmetric DRS pattern for a combination of four contiguous RBs, RB 300, RB 302, RB 304 and RB 306, with two RBs contiguous in the frequency domain and two RBs contiguous in the time domain. The DRS patterns for all four RBs may be derived from the DRS pattern in any one of the RBs, such as RB 300. Using the DRS pattern of RB 300, for example, the DRS pattern of RB 302 is the center symmetric mapping of RB 300, with the center 308 being the crossing point of the RB boundary in the time domain and the sub-frame boundary in the frequency domain. The DRS pattern of RB 304 is the reflection of the DRS pattern of RB 300 over the center line 310 of RBs 300 and 304 in the time domain. The DRS pattern of RB 306 is the reflection of the DRS pattern of RB 300 over the center line 312 of RBs 300 and 306 in the frequency domain. Using a similar algorithm, the DRS pattern of any one of RB 300, RB 302, RB 304 or RB 306 may be used to determine the DRS pattern for each of the RBs.

For an OFDM system, twin DRS patterns or other combinations of DRS patterns may be configured statically, semi-statically or dynamically. For static configurations, no explicit signaling is required between a network access device and the UA and the configuration can be defined in system specifications. For semi-static or dynamic configuration, however, a proper signaling mechanism may be required. When a pattern option for a single RB is selected, there are several mechanisms for spanning a single DRS pattern across multiple RBs. Two single RB DRS pattern options for twin DRS patterns may be selected. Alternatively, three single RB DRS pattern options may be selected, two for twin DRS patterns and another for a complementary DRS pattern. Four single RB DRS pattern options may be selected, each being derived from a single RB DRS pattern by center symmetric mapping as described above. Finally, five single RB options may be selected, four of them being derived from a single RB DRS pattern by center symmetric mapping and a fifth being complementary for three contiguous RBs.

Alternatively, the DRS patterns for each RB may be generated using predefined rules, formulas or algorithms known at both the transmitter (e.g., access device) and receiver (e.g., UA). When broadcasting an RB, for example, the access device may use a predefined algorithm to derive the DRS pattern before transmitting the RB to a UA. When using an algorithm to generate the DRS patterns, the following principles may be used to design DRS patterns. The rules to construct the DRS pattern should be simple, and the DRS pattern should be evenly distributed in the frequency-time grid, particularly regarding overall resource allocation. Scalable DRS patterns may include a nested structure. As such, a smaller bandwidth DRS pattern may be allocated to the first portion of a larger bandwidth pattern. For example, a two-RB DRS pattern may include a single RB pattern plus an extended RB pattern. A three-RB DRS pattern may include a two-RB pattern plus an extended RB pattern. Finally, the DRS pattern may not necessarily be repeated on each RB boundary.

Figure 15:
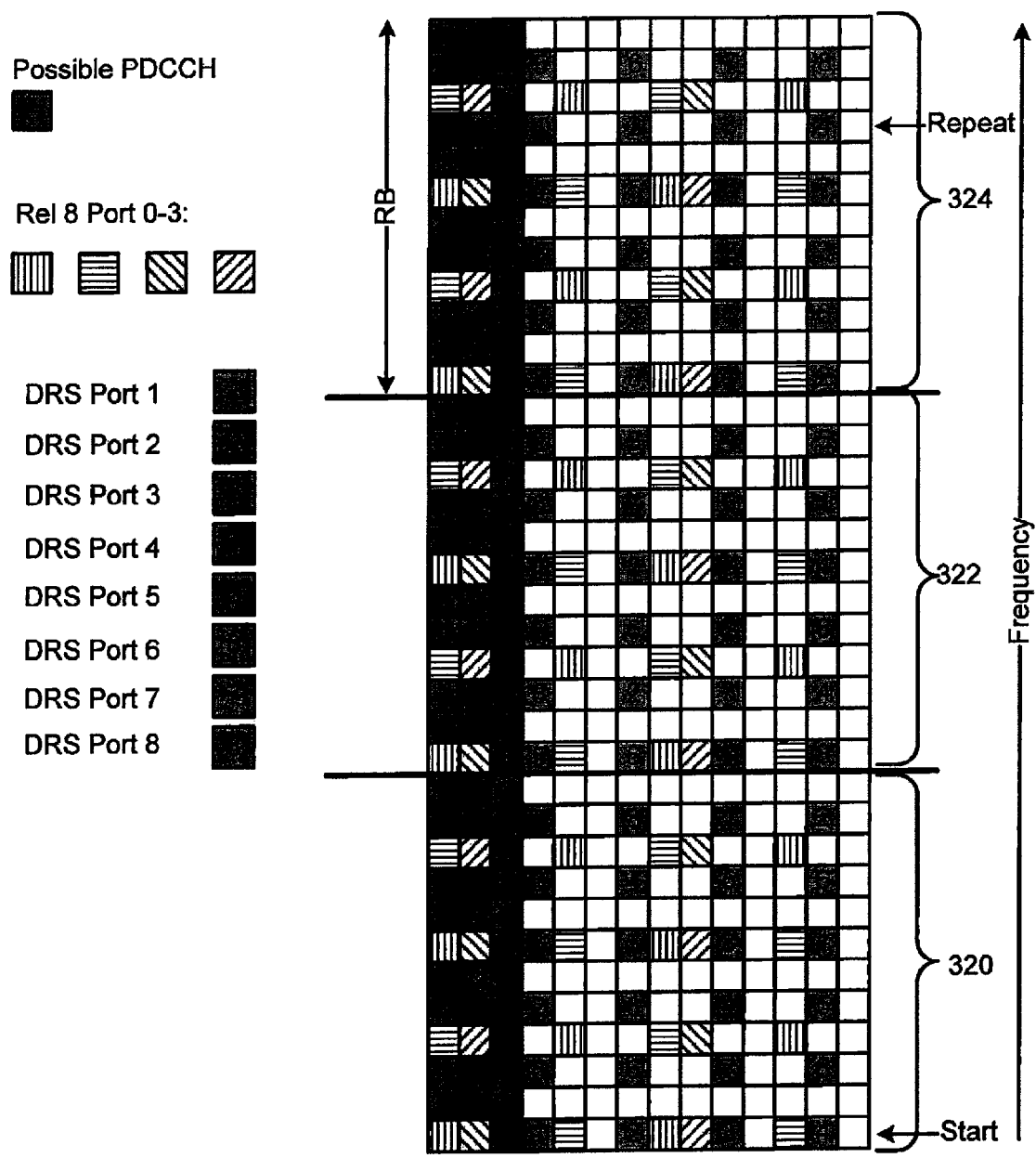
FIG. 15 illustrates a multi-RB DRS pattern constructed using a predefined algorithm for an 8-antenna system implementation.

FIG. 15 illustrates a multi-RB DRS pattern constructed using a predefined algorithm for an 8-antenna system implementation. In the following, the MIMO transmission layers correspond to the antenna ports illustrated in FIG. 5 in the DRS case. Generally, the design rules to construct the DRS pattern of FIG. 15 include the following.

First, each antenna port is assigned an index with ascending order. In FIG. 15 there are 8 antenna ports with indices 1, 2, 3, . . . 8. The REs specified for DRS are assigned to each antenna port in the order of the indices of the antenna port. The DRS REs assignment may go along the time domain first, followed by the frequency domain, or vice versa. In FIG. 15, the DRS REs for each of the antenna ports go along the time domain first, then along the frequency axis. Accordingly, starting from the first antenna port, the DRS runs from left to right at the bottom of RB 320 of FIG. 15. The DRS for the next antenna port is then positioned to the right of the previous antenna port. Accordingly, across the bottom row of RB 320, DRS REs are assigned to antenna port 1, 2, 3, and 4. Having reached the end of the row, the next higher row of available DRS REs are assigned to antenna port 5, 6, 7, and 8. If there were additional antenna ports, the next available DRS REs on the next higher row within RB 320 may be used for antenna port having those higher indices. After DRS REs are assigned for each of the antenna port indices in the sequence, move to the second or third steps.

In a second step, if the number of antenna ports (e.g., 8 in FIG. 15) is equal to a multiple of the number of OFDM symbols allocated for the DRS in each row of the RE grid (e.g., 4 in FIG. 15), after finishing one sequence of indices, the sequence is left cyclic shifted by a number to generate a new sequence for the next available DRS REs. In FIG. 15, therefore, after assigning the DRS REs for antenna port 1-8, the process starts over at the next available DRS REs within RB 320. However, the starting antenna port index is offset by 1. Accordingly, the third row of DRS REs begins with index 2, and runs through indices 3, 4, and 5. Having reached the end of the row, the next higher row of available DRS REs are assigned to indices 6, 7, 8, and 1. Accordingly, each new antenna port sequence in FIG. 15 is left cyclic shifted by 1. This algorithm may be implemented to constantly vary the DRS pattern through RBs 320, 322 and 324 as shown on FIG. 15. With each new combination of DRS REs for indices 1-8, the starting index for each pattern is offset by 1.

Figure 16:
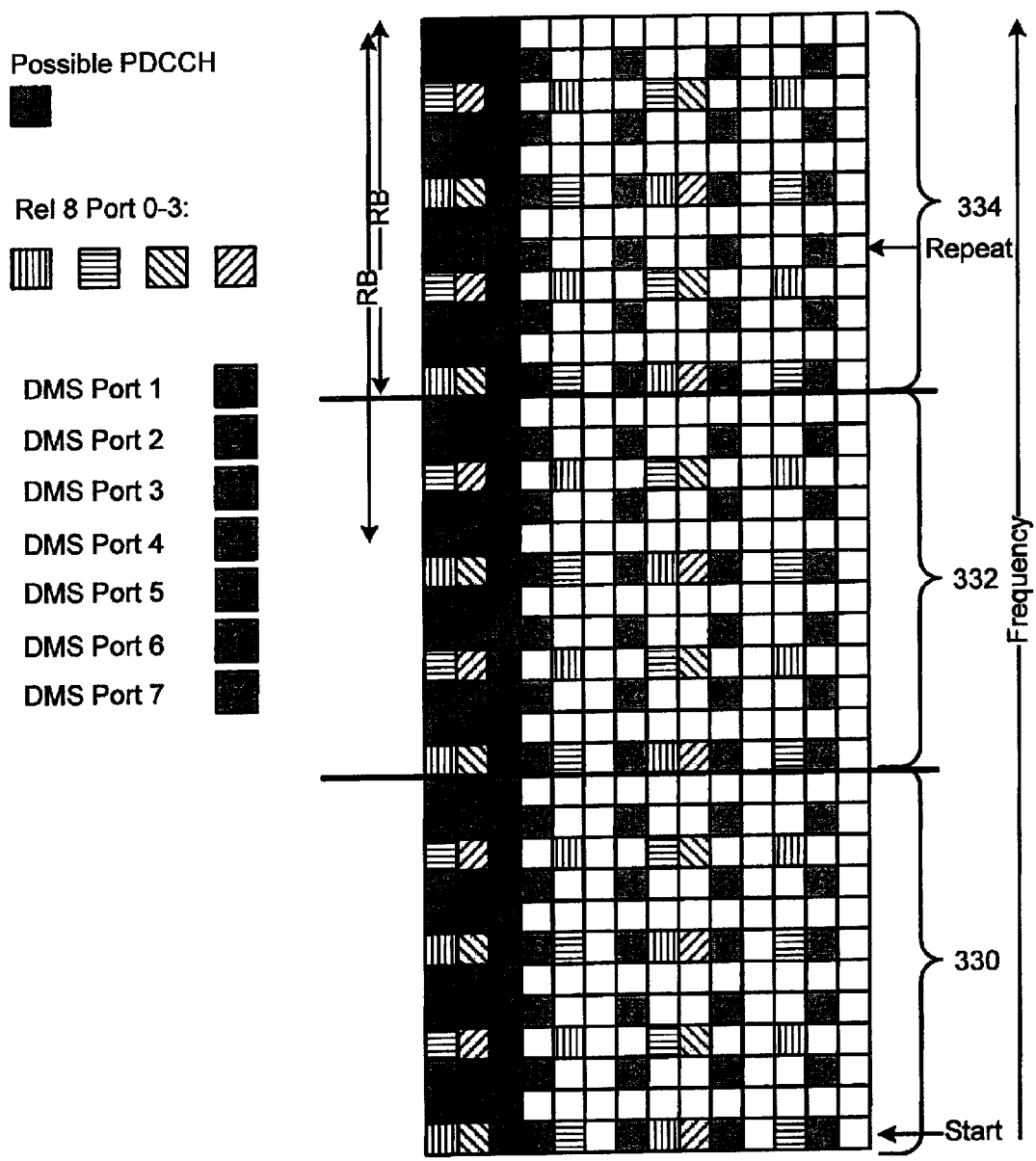
FIG. 16 illustrates a multi-RB DRS pattern constructed using a predefined algorithm for a 7-antenna system implementation.

In a third step, if the number of antennas is not equal to a multiple of the number of OFDM symbols allocated for RS at each antenna port, the index sequence generated in the first step is repeated until all REs for the DMS pattern are filled. For example, FIG. 16 illustrates a multi-RB DRS pattern constructed using a predefined algorithm for a 7-antenna port case. In FIG. 16 there are 7 antenna ports with indexes 1, 2, 3, . . . 7. In FIG. 16, the REs that make up the DRS in each RB are allocated in the order of the antenna indices. The assignment may go along the time domain first, followed by the frequency domain, or vice versa. In FIG. 16, starting at the bottom of RB 330 the available DRS REs are allocated to each antenna port index in order. Accordingly, across the bottom row of RB 330, DRS REs are defined for antenna port 1, 2, 3, and 4. Having reached the end of the row, the next higher row of available DRS REs are assigned to antenna ports 5, 6, and 7.

Figure 17:
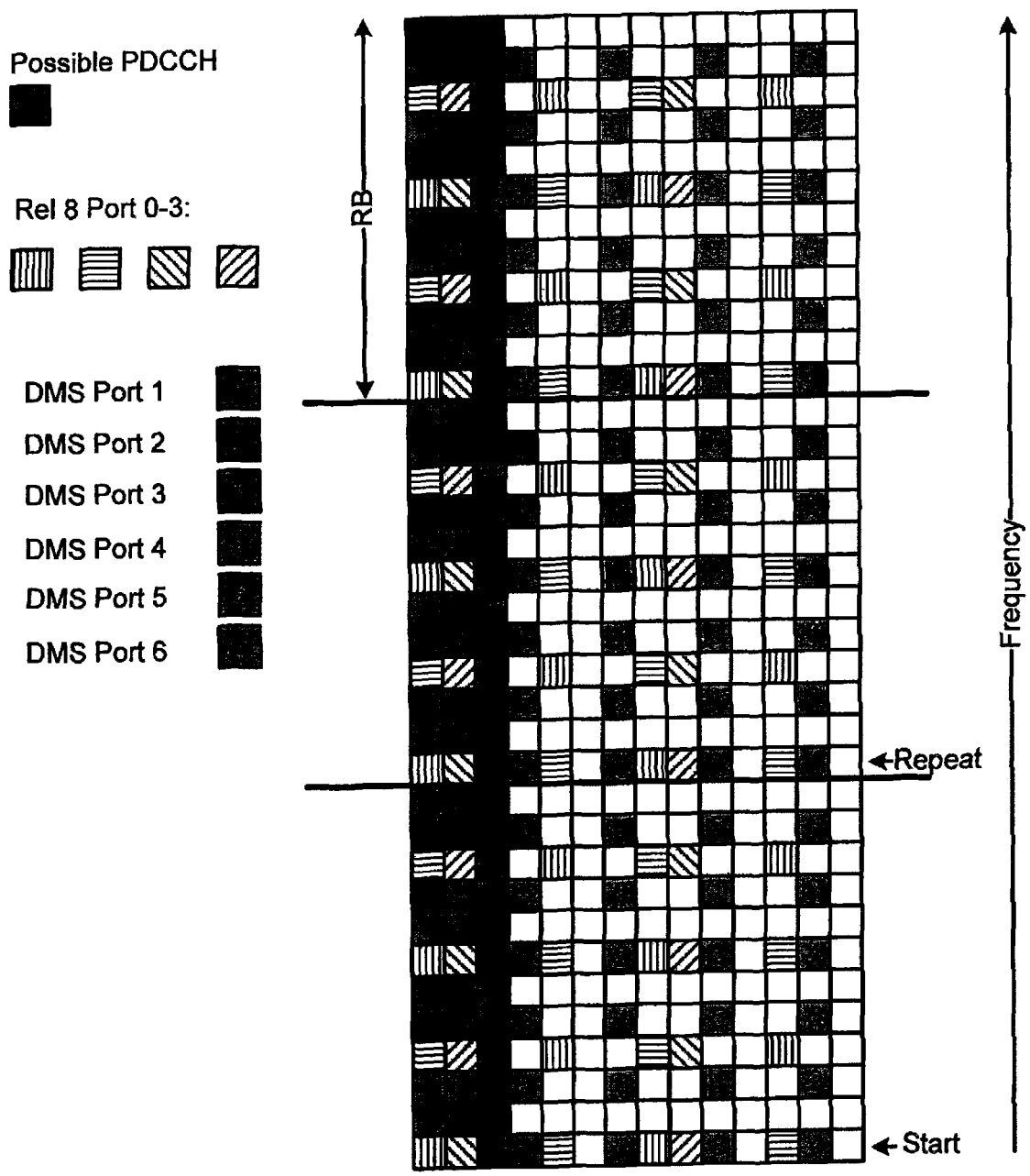
FIG. 17 illustrates a multi-RB DRS pattern constructed using the predefined algorithm of FIG. 16 for a 6-antenna system implementation.

Because all the available DRS REs have not been used on the second row of the RE grid of RB 330, the next sequence of antenna ports begins immediately following the DRS RE for antenna port 7. Accordingly, the second row of available DRS REs ends with antenna port 1. Having reached the end of the row, the next higher antenna port of available DRS REs are assigned to antenna port 2, 3, 4, and 5. Again, having reached the end of the row the next higher row of available DRS REs are assigned to antenna port 6, 7, 1, and 2. Accordingly, each new antenna port sequence in FIG. 16 begins immediately following the end DRS RE for the prior DRS sequence. The algorithm may be implemented to constantly vary the DRS pattern through RBs 330, 332 and 334. As an example, FIG. 17 illustrates a multi-RB DRS pattern constructed using the same predefined algorithm for a 6-antenna port case as was implemented for the 7-antenna port case of FIG. 16.

Figure 18:
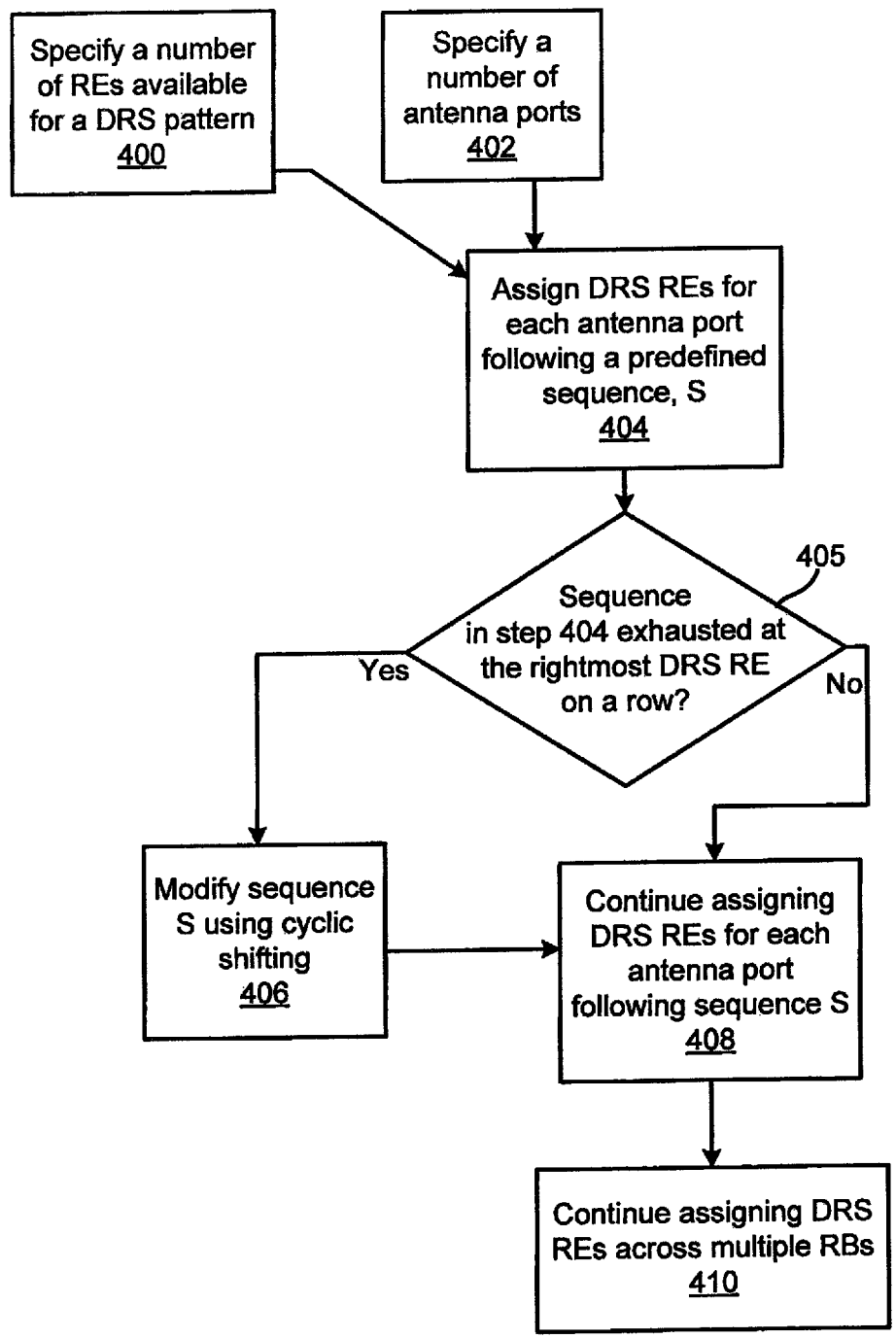
FIG. 18 is a flowchart showing a series of steps for implementing the predefined algorithm of FIGS. 15-17.

In some cases, the DRS pattern algorithm illustrated in FIGS. 15-17 may be summarized as follows and as illustrated in FIG. 18. In step 400, a number of REs and the location of each RE within a RB that are available for a DRS pattern are specified. The available REs may be arranged on a grid which takes N OFDM symbols in the time domain and M subcarriers in the frequency domain. For example, 24 REs for a DRS pattern may be specified in an RB.

In step 402, the number of antenna ports is specified, and the number of REs for each antenna port may be derived from the number of antenna ports and total number of REs as defined in step 400. For example, a total of 8 antenna ports over 24 REs would provide up to 3 RE per antenna ports in the DRS pattern of each RB.

Figure 19:
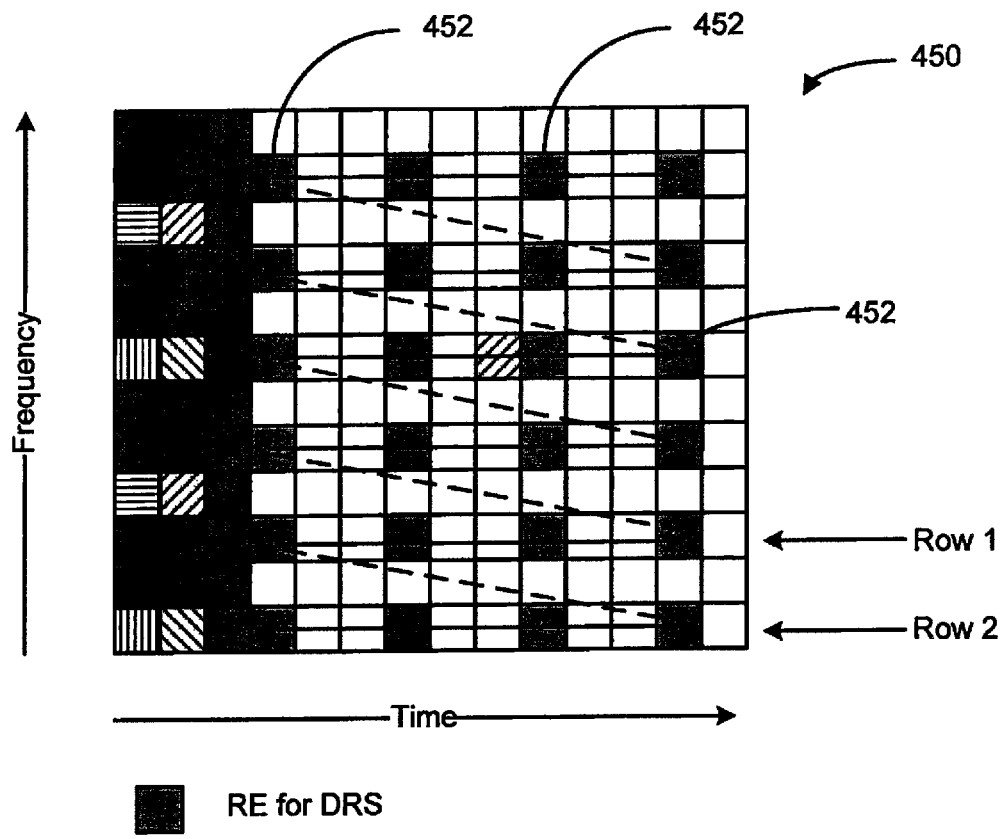
FIG. 19 illustrates a plurality of REs allocated for a DRS pattern within a RB, the RB having four REs along the time domain and six REs along the frequency domain.

In step 404, DMS REs for each antenna port are assigned following a predefined sequence, S. The assignment may go along the time domain first followed by the frequency domain. For example, FIG. 19 illustrates a plurality of REs 452 allocated for a DRS pattern within RB 450. As shown in FIG. 19, the assignment starts from the leftmost RE on the first row of the grid and continues along the time direction by assigning the antenna ports in the sequence, S, to each RE on the RB grid. If the end of the grid is reached, the assignment restarts from the leftmost RE on the next row and continues. Such assignment continues until all the antenna ports in the sequence are exhausted at decision block 405.

In step 406, if the sequence in step 404 is exhausted at the rightmost RE in a row, a new sequence S may be generated by cyclic shifting of the previous sequence by one or another integer, as illustrated in FIG. 15. The assignment and sequence generation process may be repeated until each RE for the DRS pattern in a RB is assigned to an antenna port.

Conversely, in step 408, if the sequence in step 404 is exhausted at an RE which is not located at the end of a row, a new sequence S could be generated by repeating the previous sequence (as illustrated in FIGS. 16 and 17) or by cyclic shifting the previous sequence by one or another integer. Such an assignment and sequence generation process may be repeated until all REs for DRS in a RB are assigned to an antenna port.

In step 410, in the case of multiple contiguous RBs being allocated, the above assignment steps may be carried out continuously across RBs until each RE for the DRS pattern in all RBs is assigned with an antenna port (as illustrated in FIGS. 15-17).

Figure 20:
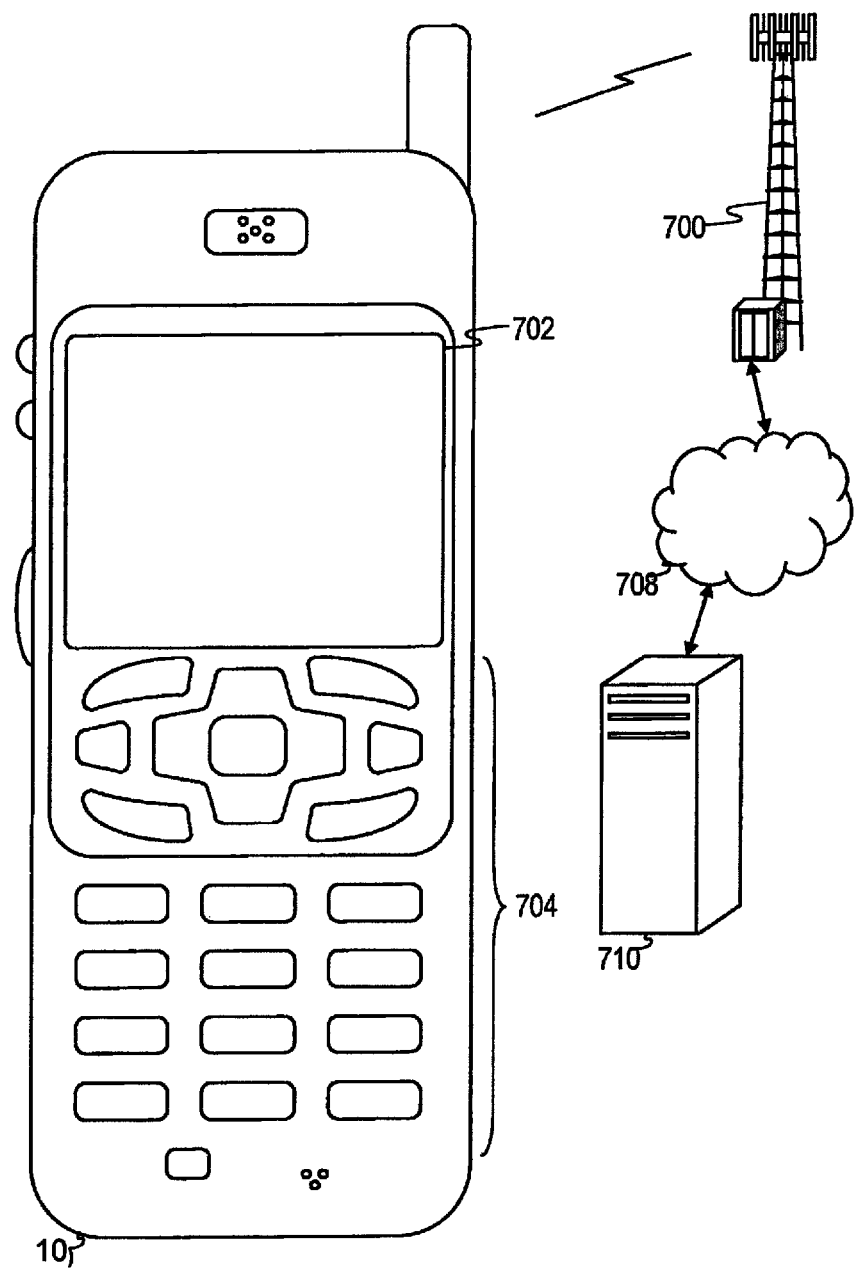
FIG. 20 is a diagram of a wireless communications system including a UA operable for some of the various embodiments of the disclosure.

FIG. 20 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 21:
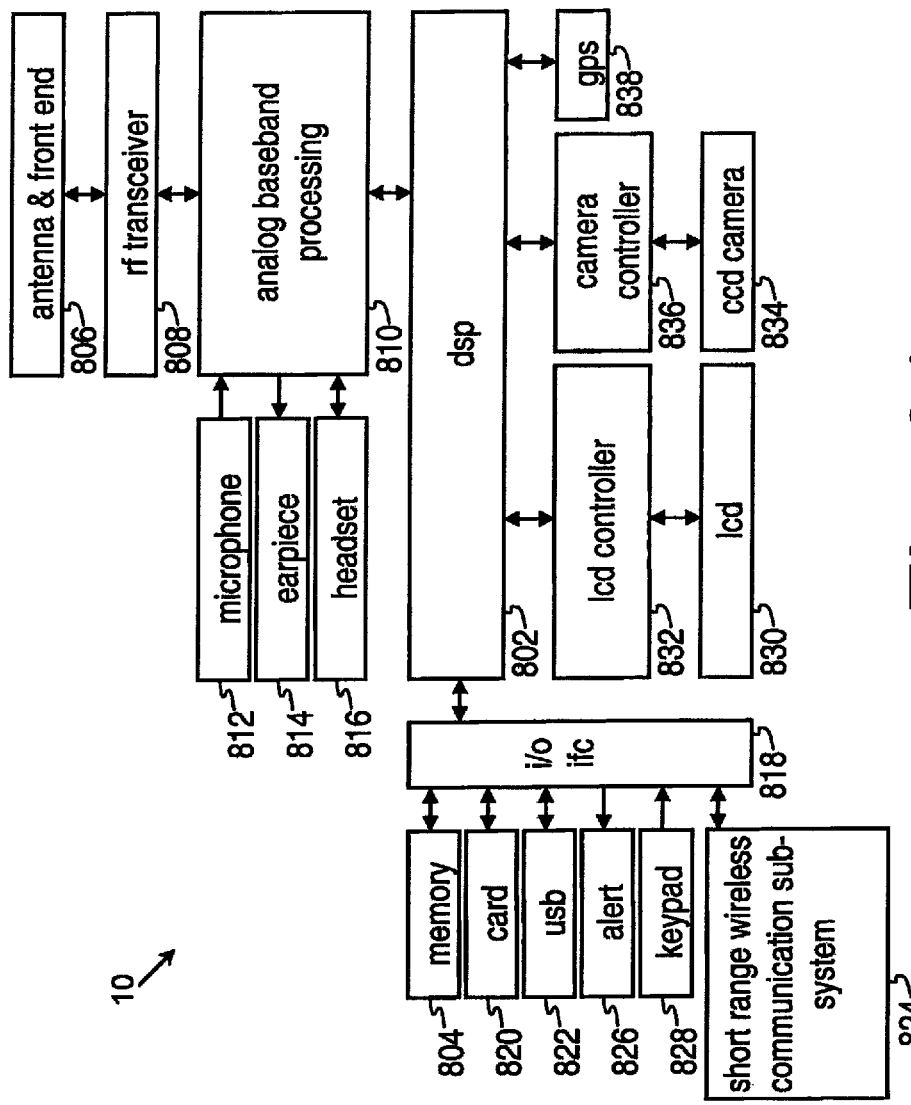
FIG. 21 is a block diagram of a UA operable for some of the various embodiments of the disclosure.

FIG. 21 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UA 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 22:
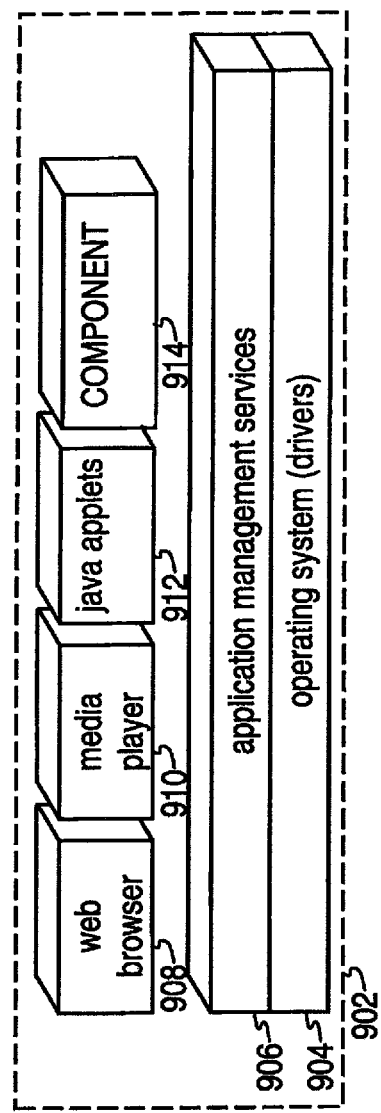
FIG. 22 is a diagram of a software environment that may be implemented on a UA operable for some of the various embodiments of the disclosure.

FIG. 22 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 22 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 23:
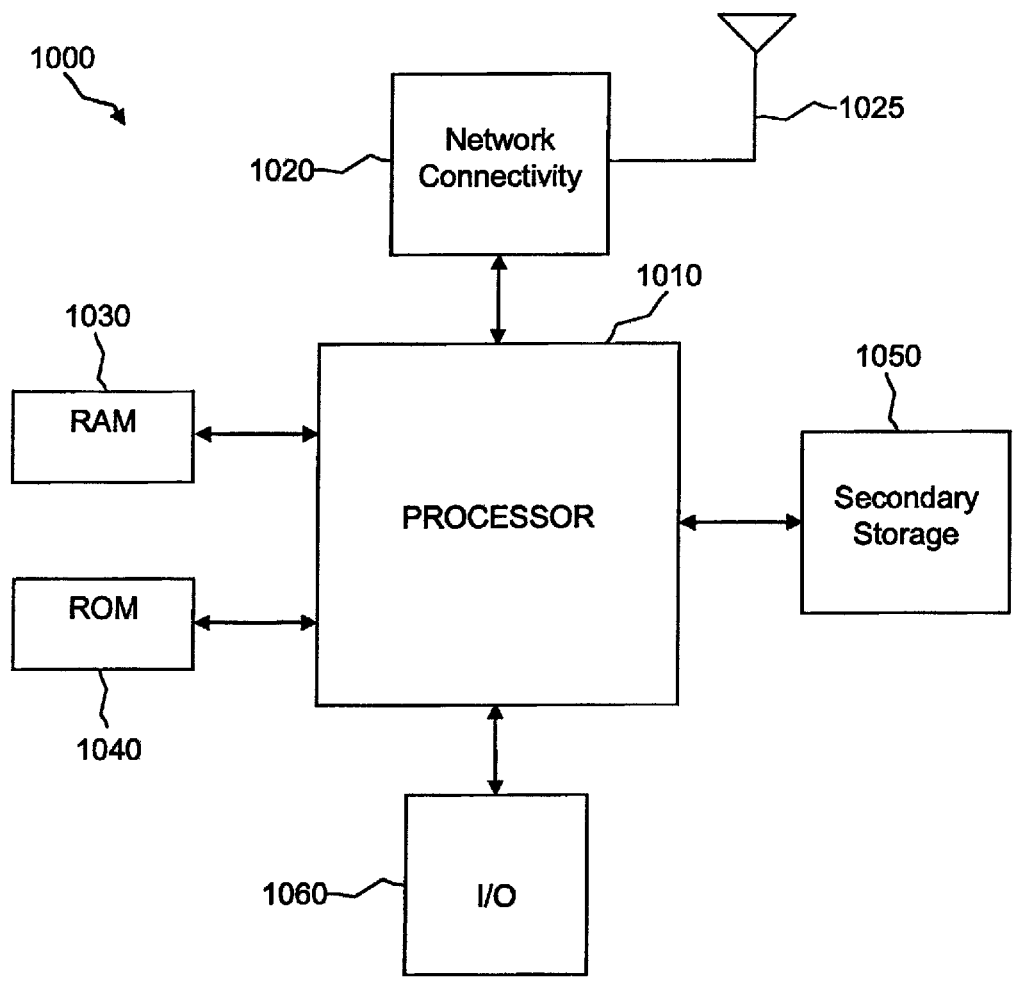
FIG. 23 is an illustrative general purpose computer system suitable for some of the various embodiments of the disclosure.

The UA 10, base station 12, and other components described above might include a processing component that is capable of executing instructions related to the actions described above. FIG. 23 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300, TS 36.211, TS 36.212 and TS 36.213.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

Thus, it should be appreciated that in a system consistent with the above comments, after a single RB DRS pattern has been specified, the single RB DRS pattern can be used to derive a DRS pattern for a plurality of contiguous RBs that are assigned to a single user agent (UA) wherein the DRS pattern for each adjacent pair of RBs in the plurality is different. From the perspective of a UA, the UA can be programmed to, based on the number of contiguous RBs assigned to the UA, determine the DRS pattern used for contiguous RBs. In some cases, the UA may maintain DRS patterns for different numbers of contiguous RBs in a UA memory for easy access.

To apprise the public of the scope of this invention, the following claims are made:

The invention claimed is:

1. A method for identifying a reference signal pattern in contiguous resource blocks received by a user agent (UA) in a wireless communication system where any of one through N contiguous resource blocks may be assigned to a UA, the method performed by a UA and comprising the steps of:
   storing resource block reference signal patterns in a UA memory where the patterns include a separate reference signal pattern for each possible number of contiguous resource blocks that may be assigned to a UA;
   receiving a resource grant indicating a number of contiguous resource blocks are assigned to the UA;
   based on the number of contiguous resource blocks assigned to the UA, identifying one of the reference signal patterns in the memory; and
   using the identified one of the reference signal patterns to identify reference signals in contiguously received resource blocks.

2. The method of claim 1 wherein, for two or more contiguous resource blocks the reference signal pattern is symmetrical.

3. A method for distributing reference signals in first and second resource blocks (RBs) of a wireless communication channel, the first and second RBs each including a plurality of resource elements (REs), being contiguous along at least one of a frequency domain and a time domain, and having a geometrical center of a physical downlink shared channel (PDSCH) region, the method comprising the steps of:
   allocating a plurality of the REs of the first RB to the reference signal at first relative locations within the at least one of the frequency domain and the time domain;
   allocating a plurality of the REs of the second RB to the reference signal at second relative locations within the at least one of the frequency domain and the time domain, the second relative locations being different than the first relative locations, the allocated REs of the first and second RBs having a center of symmetry equal to the geometrical center of the PDSCH regions of the first and second RBs combined; and transmitting the first and second RBs using the wireless communication channel.

4. The method of claim 3, wherein the reference signal is a Dedicated Reference Signal (DRS).

5. The method of claim 3, wherein the step of allocating a plurality of the REs of the second RB to the reference signal includes the steps of:
reflecting a position of a first allocated RE on the first RB about a center point of the PDSCH regions of the first and the second RBs combined and
allocating a first RE on the second RB to the reference signal, a position of the first RE on the second RB being equal to the reflected position of the first RE on the first RB.

6. The method of claim 3, wherein the step of allocating a plurality of the REs of the second RB to the reference signal includes the step of, for each of the allocated REs on the first RB, allocating an RE on the second RB to the reference signal, a position of the RE allocated on the second RB being a two-dimensional point reflection of a position of the allocated RE on the first RB.

7. The method of claim 3, wherein the wireless communication channel utilizes a plurality of antenna ports and each of the allocated REs of the first and second RBs is assigned to one of the plurality of antenna ports.

8. The method of claim 3, wherein the plurality of REs allocated to the reference signal for multiple antenna ports are configured for a wireless communication channel implementing at least one of Code-Division Multiplexing (CDM), Frequency-Division Multiplexing (FDM), and Time-Division Multiplexing (TDM).

9. The method of claim 3, including the steps of:
allocating a plurality of REs of a third RB to the reference signal, the plurality of the allocated REs of the third and second RBs having a center of symmetry equal to a geometrical center of the PDSCH regions of the second and third RBs.

10. The method of claim 9, wherein the step of allocating a plurality of the REs of the third RB to the reference signal includes the step of, for each of the allocated REs on the second RB, allocating an RE on the third RB to the reference signal, a position of the RE allocated on the third RB being a two-dimensional point reflection of the position of the allocated RE on the second RB.

11. A method for distributing reference signals in at least one resource block (RB) of a wireless communication channel utilizing a plurality of antenna ports, the RB including a plurality of resource elements (REs), the method comprising:
assigning an index (i) to each antenna port (p) of the plurality of antenna ports, wherein the indexes ($i1, i2, \ldots i_n$) are assigned to the respective antenna ports ($p1, p2, \ldots p_n$) in an ascending order of a sequence;
defining a set of candidate REs of the RB to be allocated for demodulation reference signals, the set of candidate REs being positioned within the RB in a plurality of rows, wherein each candidate RE in the set is positioned at a point of intersection for tow of the rows, the two rows comprising a row extending along a frequency domain and a row extending along a time domain, each of the two rows containing multiple candidate REs to be allocated for demodulation reference signals;
for candidate REs in a first row of the plurality of rows, assigning each of the candidate REs in the first row to one of the plurality of antenna ports in the sequence, wherein the candidate REs are assigned to the antenna ports in the ascending order of the respective indexes; and
transmitting the RB using the wireless communication channel.

12. The method of claim 11, including the step of, when a total number of candidate REs in the first row is less than a total number of the plurality of antenna ports, assigning candidate REs in a second row of the plurality of rows one of the plurality of antenna ports in the sequence starting at the antenna port assigned an index corresponding to the total number of candidate REs in the first row plus 1 candidate RE.

13. The method of claim 11, including the step of, when a total number of the plurality of antennas ports is a multiple of a total number of candidate REs in each of the plurality of rows, offsetting the index of each of the plurality of antenna ports by one, wherein the offsetting occurs after assigning candidate REs to each antenna port in the sequence.

14. The method of claim 11, wherein each row of the set of candidate REs extends through the frequency domain of the RB.

15. The method of claim 11, wherein each row of the set of candidate REs extends through the time domain of the RB.

16. A method for configuring a dedicated reference signal (DRS) pattern in a plurality of contiguous resource blocks (RBs) used in a wireless communication system, the method comprising:
specifying a single RB DRS pattern;
using the single RB DRS pattern to derive a DRS pattern for a plurality of contiguous RBs that are assigned to a single user agent (UA), wherein the DRS pattern for each adjacent pair of RBs in the plurality is different, wherein each RB in a pair of contiguous RBs comprises resource elements allocated for DRSs, the allocated resource elements having a center of symmetry located at a geometric center of a physical downlink shared channel (PDSCH) region of the RBs; and
transmitting an RB containing the single RB DRS pattern using the wireless communication channel.

* * * * *